(12) United States Patent  
Lee et al.

(10) Patent No.: US 12,314,509 B2  
(45) Date of Patent: May 27, 2025

(54) SENSOR DRIVER, AND INPUT SENSING DEVICE AND DISPLAY DEVICE INCLUDING THE SENSOR DRIVER

(71) Applicant: SAMSUNG DISPLAY CO., LTD., Yongin-si (KR)

(72) Inventors: Kang Won Lee, Yongin-si (KR); Gwang Bum Ko, Yongin-si (KR); Kyung Youl Min, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/448,321

(22) Filed: Aug. 11, 2023

(65) Prior Publication Data  
US 2024/0053851 A1 Feb. 15, 2024

(30) Foreign Application Priority Data  
Aug. 12, 2022 (KR) .................. 10-2022-0101622

(51) Int. Cl.  
*G06F 3/041* (2006.01)  
*G09G 3/32* (2016.01)  
*G09G 3/3275* (2016.01)

(52) U.S. Cl.  
CPC ........... *G06F 3/04164* (2019.05); *G09G 3/32* (2013.01); *G09G 3/3275* (2013.01); *G09G 2300/0847* (2013.01); *G09G 2310/0275* (2013.01); *G09G 2320/0233* (2013.01); *G09G 2330/021* (2013.01); *G09G 2354/00* (2013.01)

(58) Field of Classification Search  
None  
See application file for complete search history.

(56) References Cited

U.S. PATENT DOCUMENTS

| 9,880,677 B2 | 1/2018 | Lee et al. |
| 11,294,503 B2 | 4/2022 | Westerman |
| 2017/0220404 A1* | 8/2017 | Polar Seminario .......... G06F 11/0751 |
| 2021/0405794 A1* | 12/2021 | Shepelev .............. G06F 3/0412 |
| 2022/0066881 A1 | 3/2022 | Jeon |

FOREIGN PATENT DOCUMENTS

| KR | 10-1623776 | 6/2016 |
| KR | 10-2022-0028692 | 3/2022 |

* cited by examiner

*Primary Examiner* — Matthew Yeung  
(74) *Attorney, Agent, or Firm* — F. CHAU & ASSOCIATES, LLC

(57) ABSTRACT

A display device includes a display panel including pixels. A display driver provides a data signal to the display panel. A sensor overlaps the display panel. A sensor driver transmits a driving signal to the sensor and receives sensing signals corresponding to the driving signal from the sensor. The display driver and the sensor driver share a signal line and are connected to a memory through the signal line. The display driver and the sensor driver are interconnected through a flag signal line. The sensor driver outputs a flag signal to the flag signal line to inform the display driver that the sensor driver desires to access the memory.

16 Claims, 12 Drawing Sheets

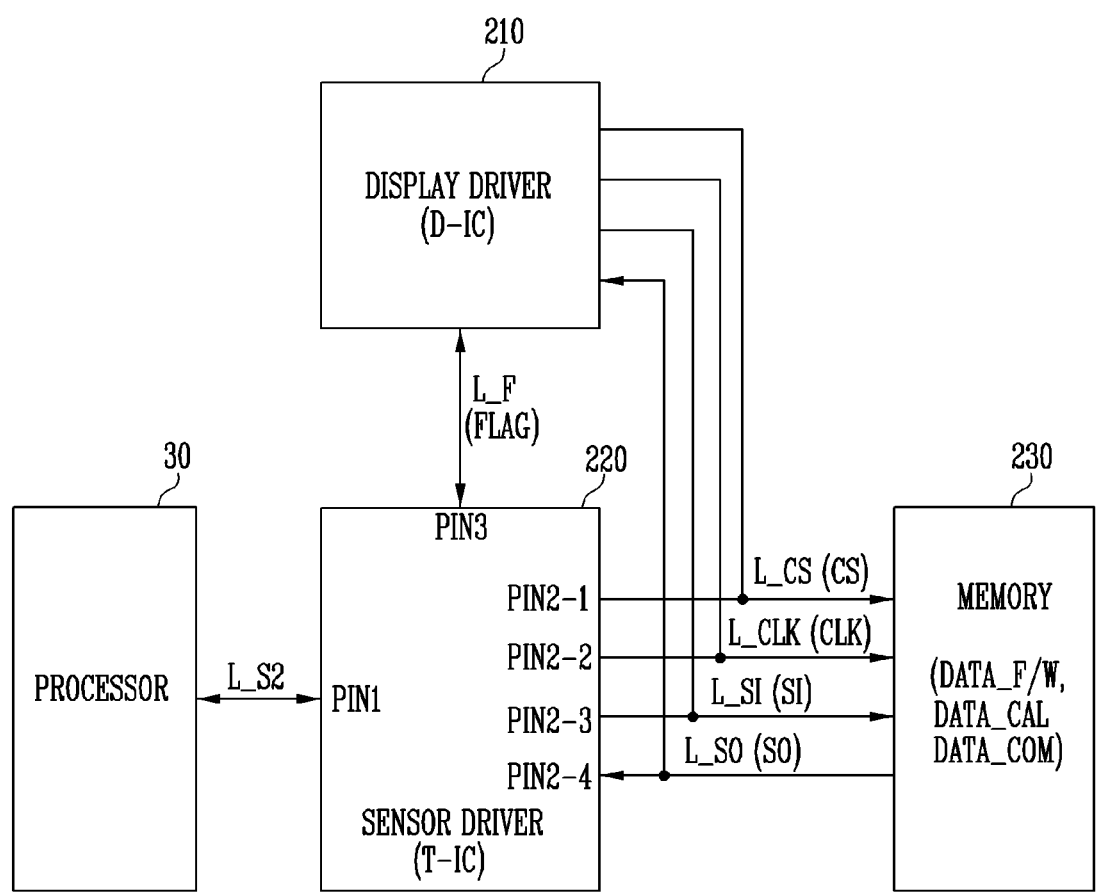

PIN1: PIN1-1, PIN1-2, PIN1-3, PIN1-4
PIN2: PIN2-1, PIN2-2, PIN2-3, PIN2-4

PIN1: PIN1-1, PIN1-2, PIN1-3, PIN1-4

SENSOR DRIVER, AND INPUT SENSING DEVICE AND DISPLAY DEVICE INCLUDING THE SENSOR DRIVER

CROSS-REFERENCE TO RELATED APPLICATION

This U.S. non-provisional patent application claims priority under 35 U.S.C. § 119 to Korean Patent Application No. 10-2022-0101622, filed on Aug. 12, 2022, in the Korean Intellectual Property Office, the disclosure of which is incorporated by reference in its entirety herein.

TECHNICAL FIELD

The disclosure relates to a sensor driver, and an input sensing device and a display device including the sensor driver.

DISCUSSION OF RELATED ART

As information technology develops, importance of a display device, which is a connection medium between a user and information, has been highlighted. In response to this, a use of a display device such as a liquid crystal display device and an organic light emitting display device is increasing.

The display device may include a display unit for displaying an image and a sensor unit for sensing a touch position. Examples of the display unit include a liquid crystal display device and an organic light emitting display device. The display unit may include a display panel including pixels and a display driver to drive the display panel. The sensor unit may include sensor electrodes and a sensor driver to drive the sensor electrodes.

The sensor driver includes an internal memory, and the sensor driver uses data stored on the internal memory to perform operations. However, the manufacturing process to manufacture a sensor driver that includes an internal memory is complex and expensive.

SUMMARY

At least one object of the disclosure is to provide a sensor driver having a simplified manufacturing process or having a reduced manufacturing cost, and a display device and an electronic device including the sensor driver.

According to embodiment of the disclosure, a display device includes a display panel including pixels, a display driver configured to provide a data signal to the display panel, a sensor overlapping the display panel, a sensor driver configured to transmit a driving signal to the sensor and receive sensing signals corresponding to the driving signal from the sensor, and a memory. The display driver and the sensor driver share a signal line and are connected to the memory through the signal line, the display driver and the sensor driver are interconnected through a flag signal line. The sensor driver outputs a flag signal to the flag signal line to inform the display driver that the sensor driver desires to access the memory.

In an embodiment, the memory is a nonvolatile memory, and the sensor driver does not include a nonvolatile memory.

The memory may store at least one of firmware and calibration data for the sensor driver, and the sensor driver may perform a calculation to calculate a coordinate of an external input to the sensor from the sensing signals using the firmware or calibrate the calculation using the calibration data.

The sensor driver may include a volatile memory, and the sensor driver may load the firmware from the memory into the volatile memory during initial driving.

The memory may further store data regarding a characteristic deviation of the pixels or compensation data for compensating for the characteristic deviation.

One of the display driver and the sensor driver may be selectively connected to the memory according to the flag signal, and another of the display driver and the sensor driver may become a high impedance state with respect to the signal line.

When the sensor driver transmits the flag signal to the display driver through the flag signal line, the sensor driver may load data from the memory, and the display driver may have a high impedance state with respect to the memory.

When the display driver transmits the flag signal to the sensor driver through the flag signal line, the display driver may load data from the memory, and the sensor driver may have a high impedance state with respect to the memory.

The display device may further include a processor, and the sensor driver may include at least one first terminal connected to the processor, at least one second terminal connected to the signal line, and a third terminal connected to the flag signal line.

The processor may further include a nonvolatile memory, firmware of the sensor driver may be stored in the nonvolatile memory of the processor, and the sensor driver may load the firmware from the nonvolatile memory of the processor.

The memory may store calibration data, and the sensor driver may load the calibration data from the memory.

The pixels may include light emitting elements, the display panel may further include an insulating layer covering the light emitting elements, and the sensor may be formed directly on the insulating layer.

According to an embodiment of the disclosure, an input sensing device connected to a processor includes a sensor panel including sensors, and a sensor driver configured to transmit a driving signal to the sensors and receive sensing signals corresponding to the driving signal from the sensors. The sensor driver loads firmware stored in a nonvolatile memory of the processor.

In an embodiment, the sensor driver does not include a nonvolatile memory.

In an embodiment, the sensor driver loads calibration data from an external memory located outside the input sensing device.

The sensor driver may share a signal line with an external device, may be connected to the external memory through the signal line, and may transmit a flag signal through a flag signal line to the external device indicating a desire to connect to the external memory.

According to an embodiment of the disclosure, a sensor driver includes a transceiver configured to output a driving signal and receive a sensing signal corresponding to the driving signal, a controller configured to calculate coordinates of an external input based on the sensing signal, a first interface unit configured to output information on the coordinate through a first terminal, and a second interface unit configured to receive firmware through a second terminal. The controller calculates the coordinate from the sensing signal using the firmware, and outputs a flag signal indicating an operation state of the second interface unit through a third terminal.

In an embodiment, the sensor does not include a nonvolatile memory.

In an embodiment, the sensor driver further includes a volatile memory storing the firmware and the firmware is received from the volatile memory through the second terminal during an initial driving of the sensor driver.

When the flag signal is applied to the third terminal from an outside source, the second interface unit may set the second terminal to a high impedance state.

A sensor driver according to at least one embodiment of the disclosure does not include a separate nonvolatile memory (for example, a flash memory) for storing firmware and calibration data (that is, flash less IC). The firmware and the calibration data may be stored in a memory outside the sensor driver (for example, a memory for the display driver, and a memory of the processor). Therefore, a manufacturing process of the sensor driver may be simplified, and a size and a manufacturing cost of the sensor driver may be reduced. In addition, a manufacturing cost of the input sensing device and the display device including the sensor driver may be reduced.

In addition, the sensor driver may share a signal line connected to the memory with the display driver, and the sensor driver and the display driver may be selectively connected to the memory according to the flag signal. Therefore, collision between the display driver and the sensor driver may be prevented in a data transmission process with the memory, and the display driver and the sensor driver may stably operate.

BRIEF DESCRIPTION OF THE DRAWINGS

The above and other features of the disclosure will become more apparent by describing in further detail embodiments thereof with reference to the accompanying drawings, in which:

FIG. 2 is a block diagram illustrating an embodiment of a driving circuit unit included in the display device of FIG. 1;

DETAILED DESCRIPTION OF THE EMBODIMENTS

Figure 1:
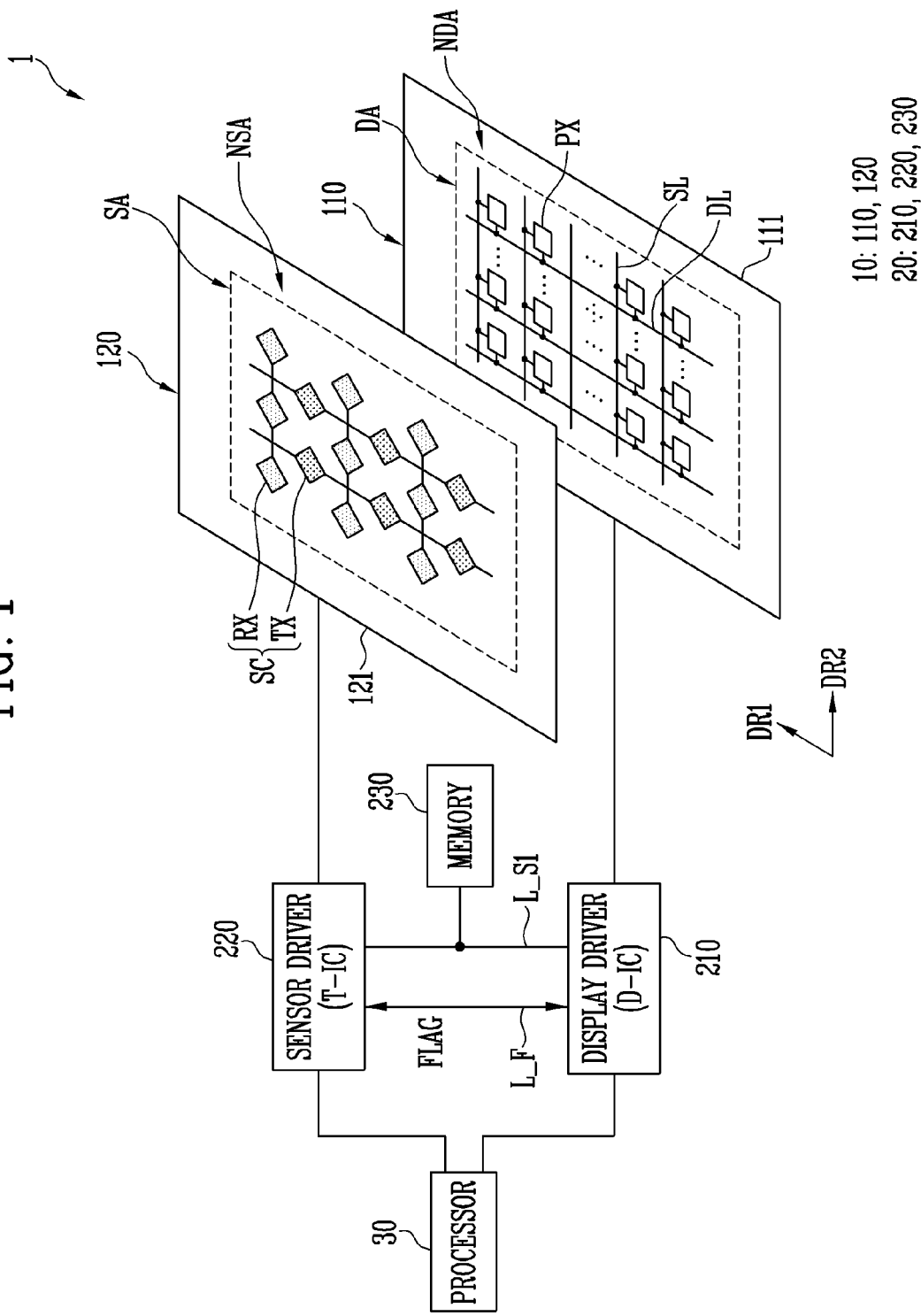
FIG. 1 is a diagram illustrating a display device according to an embodiment of the disclosure.

Hereinafter, various embodiments of the disclosure will be described in detail with reference to the accompanying drawings to enable those skilled in the art to implement the disclosure. The disclosure may be implemented in various different forms and is not limited to the embodiments described herein.

The same or similar elements may be denoted by the same reference numerals throughout the specification. Therefore, the same reference numerals may be used in other drawings.

In addition, sizes and thicknesses of each component shown in the drawings may be shown for convenience of description, and thus the disclosure is not necessarily limited to those shown in the drawings. In the drawings, thicknesses may be exaggerated to clearly express various layers and areas.

Some embodiments are described in the accompanying drawings in relation to functional block, unit, and/or module. Those skilled in the art will understand that such block, unit, and/or module may be physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interacting individual blocks, units, and/or modules without departing from the scope of the inventive concept. In addition, in some embodiments, the block, unit and/or module may be physically combined into more complex blocks, units, and/or modules without departing from the scope of the inventive concept.

A term "connection" between two configurations may mean that both of an electrical connection and a physical connection are used inclusively, but is not limited thereto. For example, "connection" used based on a circuit diagram may mean an electrical connection, and "connection" used based on a cross-sectional view and a plan view may mean a physical connection.

Although a first, a second, and the like are used to describe various components, these components are not limited by these terms. These terms are used only to distinguish one component from another component. Therefore, a first component described below may be a second component within the technical spirit of the disclosure. The singular expression includes the plural expression unless the context clearly dictates otherwise.

Meanwhile, the disclosure is not limited to the embodiments disclosed below, and may be modified in various forms. In addition, each of the embodiments disclosed below may be implemented alone or in combination with at least one of other embodiments.

FIG. 1 is a diagram illustrating a display device according to an embodiment of the disclosure.

Referring to FIG. 1, the display device 1 may be applied to an electronic device such as a computer, a laptop computer, a cellular phone, a smart phone, a personal digital assistant (PDA), a portable multimedia player (PMP), a digital TV, a digital camera, a portable game console, a navigation device, a wearable device, an internet of things (IOT) device, an internet of everything (IoE) device, an e-book, a virtual reality (VR) device, an augmented reality (AR) device, a vehicle navigation system, a video phone, a surveillance system, an automatic focus system, a tracking system, or a motion sensing system.

The display device 1 may include a panel 10 and a driving circuit unit 20 for driving the panel. In addition, the display device 1 may further include a processor 30 or may be connected to the processor 30.

The panel 10 may include a display unit 110 (or a display panel) for displaying an image and a sensor unit 120 (a sensor, or a sensor panel) for sensing an external input such as touch, pressure, fingerprint, or hovering. For example, the panel 10 may include pixels PX and sensors SC (or sensor electrodes) positioned to overlap at least a portion of the pixels PX. For example, the pixels PX may display an image in a display frame period unit. For example, the sensors SC may sense an input of a user in a sensing frame period unit. A sensing frame period and a display frame period may be independent of each other or may be different from each other. The sensing frame period and the display frame period may be synchronized with each other or may be asynchronous. The sensor unit 120 may configure an input sensing device together with a sensor driver 220.

According to an embodiment, the display unit 110 and the sensor unit 120 may be separately manufactured, and then disposed and/or combined so that at least one area overlaps each other. Alternatively, in another embodiment, the display unit 110 and the sensor unit 120 may be integrally manufactured. For example, the sensor unit 120 may be directly formed on at least one substrate configuring the display unit 110 (for example, an upper substrate and/or a lower substrate of the display panel, or a thin film encapsulation layer), or on other insulating layers or various functional layers (for example, an optical layer or a protective layer).

While, in FIG. 1, the sensor unit 120 is disposed on a front surface (for example, an upper surface on which an image is displayed) of the display unit 110, but a position of the sensor unit 120 is not limited thereto. For example, in another embodiment, the sensor unit 120 may be disposed on a back surface or both surfaces of the display unit 110. In still another embodiment, the sensor unit 120 may be disposed on at least one edge area of the display unit 110.

The display unit 110 may include a display substrate 111 and a plurality of pixels PXL formed on the display substrate 111. The pixels PXL may be disposed in a display area DA of the display substrate 111.

The display substrate 111 may include the display area DA where an image is displayed and a non-display area NDA outside the display area DA. According to an embodiment, the display area DA may be disposed in a center area of the display unit 110, and the non-display area NDA may be disposed in an edge area of the display unit 110 to surround the display area DA.

The display substrate 111 may be a rigid substrate or a flexible substrate, but a material or a physical property thereof is not particularly limited. For example, the display substrate 111 may be a rigid substrate formed of glass or tempered glass, or a flexible substrate formed of a thin film of a plastic or metal material.

Scan lines SL and data lines DL, and pixels PX connected to the scan lines SL and the data lines DL may be disposed in the display area DA. The pixels PX may be selected by a scan signal of a turn-on level supplied from the scan lines SL, receive a data signal from the data lines DL, and emit light of a luminance corresponding to the data signal. Therefore, an image corresponding to the data signal may be displayed in the display area DA. In the disclosure, a structure, a driving method, and the like of the pixels PX are not particularly limited. For example, each of the pixels PX may be implemented as a pixel employing various structures and driving methods.

In the non-display area NDA, various lines and/or a built-in circuit unit connected to the pixels PXL of the display area DA may be disposed. For example, a plurality of lines for supplying various power and control signals to the display area DA may be disposed in the non-display area NDA, and a scan driver or the like may be further disposed in the non-display area NDA.

In the disclosure, a type of the display unit 110 is not particularly limited. For example, the display unit 110 may be implemented as a self-emission type display panel such as an organic light emitting display panel. However, when the display unit 110 is implemented as a self-emission type, each of the pixels PX is not limited to a case where only an organic light emitting element is included. For example, a light emitting element of each of the pixels PX may be configured of an organic light emitting diode, an inorganic light emitting diode, a quantum dot/well light emitting diode, or the like. According to an embodiment, a plurality of light emitting elements may be provided in each of the pixels PX. The plurality of light emitting elements may be connected in series, parallel, series-parallel, or the like. Alternatively, the display unit 110 may be implemented as a non-emission type display panel such as a liquid crystal display panel. When the display unit 110 is implemented as a non-emission type, the display device 1 may additionally include a light source such as a backlight unit.

The sensor unit 120 may include a sensor substrate 121 and a plurality of sensors SC formed on the sensor substrate 121. The sensors SC may be disposed in a sensing area SA on the sensor substrate 121.

The sensor substrate 121 may include the sensing area SA in which a touch input or the like may be sensed, and a peripheral area NSA outside the sensing area SA. According to an embodiment, the sensing area SA may be disposed to overlap at least one area of the display area DA. For example, the sensing area SA may be set to an area corresponding to the display area DA (for example, an area overlapping the display area DA), and the peripheral area NSA may be set to an area corresponding to the non-display area NDA (for example, an area overlapping the non-display area NDA). In this case, when a touch input or the like is provided on the display area DA, the touch input may be detected through the sensor unit 120.

The sensor substrate 121 may be a rigid or flexible substrate, and may be configured of at least one layer of an insulating layer. In addition, the sensor substrate 121 may be a transparent or translucent light-transmitting substrate, but is not limited thereto. That is, in the disclosure, a material and a physical property of the sensor substrate 121 are not particularly limited. For example, the sensor substrate 121 may be a rigid substrate formed of glass or tempered glass, or a flexible substrate formed of a thin film of a plastic or metal material. In addition, according to an embodiment, at least one substrate (for example, the display substrate 111, an encapsulation substrate and/or a thin film encapsulation layer) configuring the display unit 110, at least one layer of an insulating layer, a functional layer, or the like disposed in an inside and/or on an outer surface of the display unit 110 may be used as the sensor substrate 121.

The sensing area SA may be set as an area capable of responding to a touch input (that is, an active area of a sensor). To this end, the sensors SC for sensing the touch input or the like may be disposed in the sensing area SA.

In an embodiment, the sensors SC may include first sensors TX (or driving electrodes) and second sensors RX (or sensing electrodes). In another embodiment (for example, self-capacitance type), the sensors SC may be configured of one type of sensors without distinction between the first and second sensors TX and RX.

For example, each of the first sensors TX may extend in a first direction DR1. The first sensors TX may be arranged along a second direction DR2. The second direction DR2 may be different from the first direction DR1. For example, the second direction DR2 may be a direction orthogonal to the first direction DR1. In another embodiment, an extension direction and an arrangement direction of the first sensors TX may follow another configuration. Each of the first sensors TX may have a form in which first cells (or driving electrodes) of a relatively large area and first bridges of a relatively narrow area may be connected. In FIG. 1, each of the first cells is shown in a diamond shape, but each of the first cells may be configured in various other shapes such as a circle, a quadrangle, a triangle, and a mesh form. For example, the first bridges may be integrally formed on the same layer as the first cells. In another embodiment, the first bridges may be formed on a layer different from that of the first cells and may electrically connect adjacent first cells.

For example, each of the second sensors RX may extend in the second direction DR2. The second sensors RX may be arranged along the first direction DR1. In another embodiment, an extension direction and an arrangement direction of the second sensors RX may follow another configuration. Each of the second sensors RX may have a form in which second cells (or sensing electrodes) of a relatively large area and second bridges of a relatively narrow area are connected. In FIG. 1, each of the second cells is shown in a diamond shape, but each of the second cells may be configured in various shapes such as a circle, a quadrangle, a triangle, and a mesh form. For example, the second bridges may be integrally formed on the same layer as the second cells. In another embodiment, the second bridges may be formed in a layer different from that of the second cells and may electrically connect adjacent second cells.

According to an embodiment, each of the first sensors TX and the second sensors RX may have conductivity by including at least one of a metal material, a transparent conductive material, and various other conductive materials. For example, the first sensors TX and the second sensors RX may include at least one of various metal materials including gold (Au), silver (Ag), aluminum (Al), molybdenum (Mo), chromium (Cr), titanium (Ti), nickel (Ni), neodymium (Nd), copper (Cu), and platinum (Pt), or an alloy thereof. At this time, the first sensors TX and the second sensors RX may be configured in a mesh form. In addition, the first sensors TX and the second sensors RX may include at least one of various transparent conductive materials including silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide ($SnO_2$), carbon nano tube, graphene, and the like. In addition, the first sensors TX and the second sensors RX may have conductivity by including at least one of various conductive materials. In addition, each of the first sensors TX and the second sensors RX may be formed of a single layer or multiple layers, but a cross-sectional structure thereof is not particularly limited.

Meanwhile, the sensor lines for electrically connecting the first and second sensors TX and RX to the sensor driver 220 and the like may be internally disposed in the peripheral area NSA of the sensor unit 120.

The driving circuit unit 20 may include a display driver 210 for driving the display unit 110 and a sensor driver 220 for driving the sensor unit 120. In addition, the driving circuit unit 20 may further include a memory 230 (or an external memory). Each of the display driver 210 and the sensor driver 220 may be implemented as an integrated circuit (IC) (for example, a display integrated circuit (D-IC) and a sensor integrated circuit (T-IC)). The memory 230 may be implemented as a nonvolatile memory such as a flash memory. In an embodiment, the memory 230 is located outside the sensor driver 220.

The display driver 210 may be electrically connected to the display 110 to drive the pixels PX. For example, the display driver 210 may provide a data signal to the pixels PX. In an embodiment, the display driver 210 may include a data driver (e.g., a driver circuit) and a timing controller (e.g., a control circuit), and a scan driver (e.g., a driver circuit) may be separately mounted in the non-display area NDA of the display 110 (refer to FIG. 10). The scan driver may provide a scan signal to the pixels PX. In another embodiment, the display driver 210 may include all or at least a portion of the data driver, the timing controller, and the scan driver.

The sensor driver 220 may be electrically connected to the sensor unit 120 to drive the sensor unit 120. The sensor driver 220 may include a transmitter that transmits a driving signal to the sensor unit 120 and a receiver that receives a sensing signal corresponding to the driving signal from the sensor unit 120. According to an embodiment, the transmitter and the receiver may be integrated in one IC, but the disclosure is not limited thereto.

The memory 230 may store data necessary for an operation of the driving circuit unit 20. For example, the memory 230 may store information on a characteristic deviation of the pixels PX in the display unit 110 or compensation data (refer to "DATA_COM" of FIG. 2) for compensating for the characteristic deviation (for example, luminance unevenness due to the characteristic deviation). Here, the characteristic deviation may occur due to a process deviation or deterioration of the pixels PX. The display driver 210 may compensate for image data based on the information on the characteristic deviation or the compensation data to generate a data signal. Therefore, the pixels PX may emit light with a uniform luminance or each of the pixels PX may emit light with an accurate luminance.

In addition, the memory 230 may further store at least one of firmware (refer to "DATA_F/W" of FIG. 2) and calibration data (refer to "DATA_CAL" of FIG. 2) for the sensor driver 220. Here, the firmware may include a system operating program for operating the sensor driver 220, or an algorithm for the sensor driver 220 to sense the external input (for example, the touch input or the like) from the sensing signal or calculate a coordinate of the external input, and the calibration data may include data (for example, an offset value) or the like used in correcting an error between the calculated coordinate and an actual coordinate of the external input.

As will be described later, the sensor driver 220 does not include a separate nonvolatile memory (for example, a flash memory) for storing the firmware and the calibration data (that is, a flash less IC), and the firmware and/or the calibration data are accordingly stored in the memory 230 (an external memory, or a memory for the display driver 210). In this case, a size and a manufacturing cost of the sensor driver 220 may be reduced. For example, the sensor driver 220 and the display driver 210 may share the memory 230.

In an embodiment, the display driver 210 and the sensor driver 220 share a signal line L_S1 and may be connected to the memory 230 through the same signal line L_S1. In addition, the display driver 210 and the sensor driver 220 may be interconnected through a flag signal line L_F that transmits a flag signal FLAG. In an embodiment, the flag signal line L_F is not connected to the memory 230. Here, the flag signal FLAG may indicate a connection state between one of the display driver 210 and the sensor driver 220 and the memory 230 (or whether the memory 230 is accessed). For example, the flag signal FLAG may indicate one of the display driver 210 and the sensor driver 220 desires to access the memory 230.

For example, the display driver 210 may output the flag signal FLAG to the flag signal line L_F, and the display driver 210 may load or receive the compensation data from the memory 230. In this case, the sensor driver 220 receiving the flag signal FLAG may wait before accessing the memory 230 or stop accessing the memory 230. In an embodiment, after the display driver 210 outputs the flag signal FLAG to the flag signal line L_F, the display driver 210 waits a first period of time before connecting itself to the signal lines (e.g., L_CS, L_CLK, and L_SI). For example, if the sensor driver 220 is accessing the memory 230 when the display driver 210 outputs the flag signal FLAG, the first period is designed to be larger than the amount of time it takes for the sensor driver 220 to stop accessing the memory 230. The sensor driver 220 may disconnect its pins PIN2-1, PIN2-2, PIN2-3 from the signal lines (e.g., L_CS, L_CLK, and L_SI) after it has completed accessing the memory 230. As another example, the sensor driver 220 may output the flag signal FLAG to the flag signal line L_F, and the sensor driver 220 may load or receive at least one of the firmware and the calibration data from the memory 230. In this case, the display driver 210 receiving the flag signal FLAG may wait before accessing the memory 203 or stop accessing the memory 230. In an embodiment, after the sensor driver 220 outputs the flag signal FLAG to the flag signal line L_F, the sensor driver 220 waits a second period of time before connecting itself to the signal lines (e.g., L_CS, L_CLK, and L_SI). For example, if the display driver 210 is accessing the memory 230 when the sensor driver 220 outputs the flag signal FLAG, the second period is designed to be larger than the amount of time it takes for the display driver 210 to stop accessing the memory 230. The flag signal FLAG may be used to prevent the sensor driver 220 and the display driver 210 from both accessing the memory 230 at the same time.

A connection relationship between the display driver 210, the sensor driver 220, and the memory 230 and the flag signal are described later with reference to FIG. 2.

The processor 30 may control an operation of the display driver 210 and the sensor driver 220.

In an embodiment, the processor 30 (a host processor, or a main processor) may be implemented as at least one of an application processor (AP), a graphics processing unit (GPU), and a central processing unit (CPU).

For example, the processor 30 may execute an application based on a touch input (or a coordinate of the touch input) sensed by the sensor driver 220, and the processor 30 may provide image data to the display driver 210 so that an image corresponding to the application is displayed on the display unit 110. For example, the processor 30 may control the sensor driver 220 to operate in a first mode for sensing a touch input, a second mode for sensing a fingerprint, hovering, or the like, and a third mode that is an idle state.

According to an embodiment, the processor 30 may further include a nonvolatile memory, and data (for example, firmware) for the sensor driver 220 may be stored in the nonvolatile memory. This is described later with reference to FIG. 7.

As described above, the firmware or the like for the sensor driver 220 may be stored in the memory 230 (for example, a memory for the display driver 210) outside the sensor driver 220. Therefore, the sensor driver 220 does not include a memory (for example, a flash memory) for storing the firmware or the like, the size and the manufacturing cost of the sensor driver 220 may be reduced, and a manufacturing cost of the display device 1 including the sensor driver 220 may be reduced.

In addition, the sensor driver 220 may share the signal line L_S1 connected to the memory 230 with the display driver 210, and the sensor driver 220 and the display driver 210 may be selectively connected to the memory 230 using the flag signal FLAG. Therefore, collision between the display driver 210 and the sensor driver 220 may be prevented during a data transmission process with the memory 230, and the display driver 210 and the sensor driver 220 may stably operate.

Figure 3A:
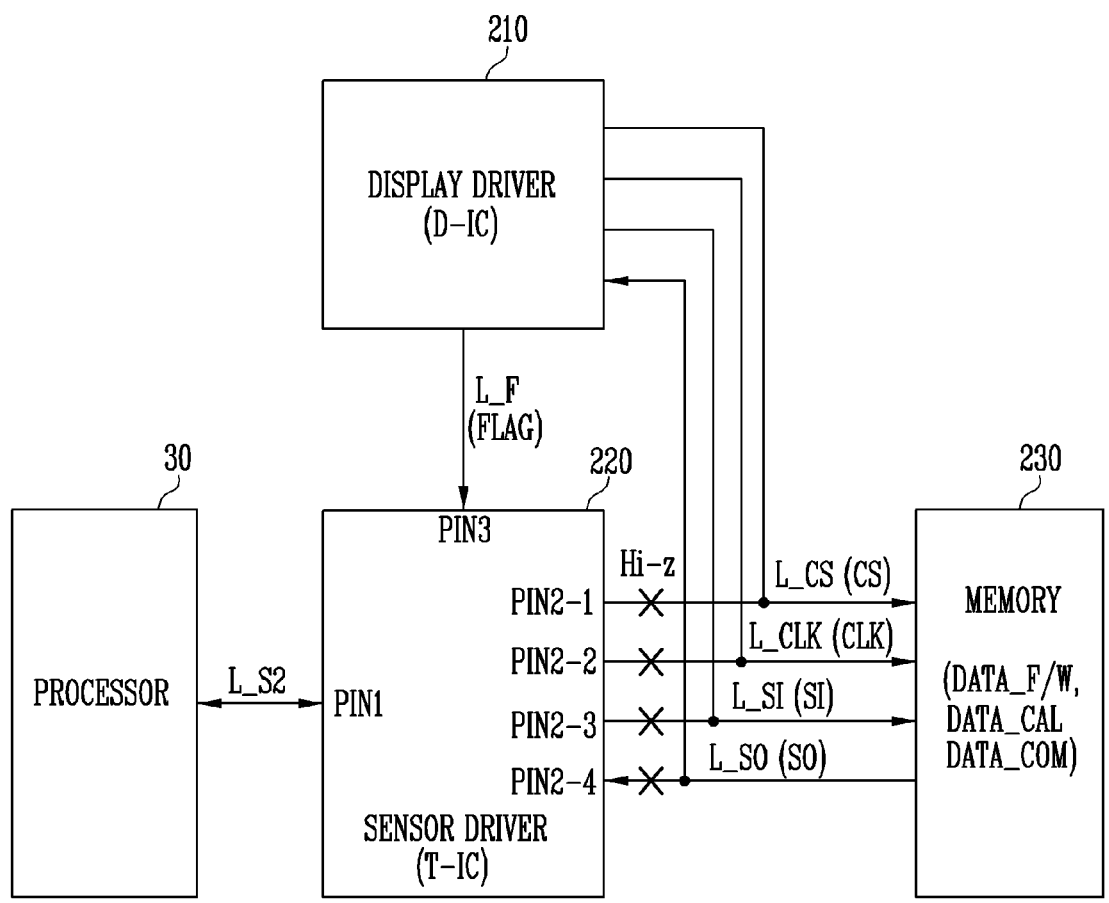
FIGS. 3A and 3B are diagrams illustrating an embodiment of an operation of the driving circuit unit of FIG. 2.
Figure 3B:
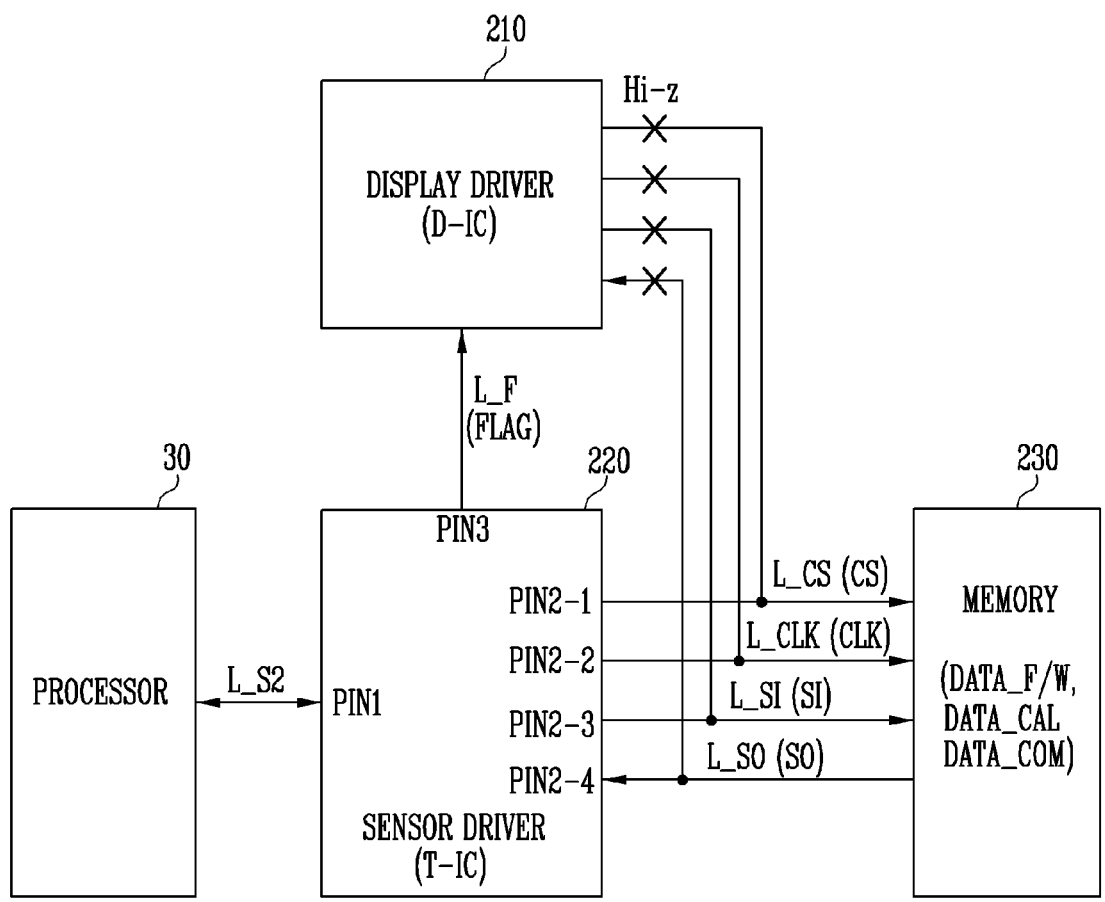

FIG. 2 is a block diagram illustrating an embodiment of the driving circuit unit included in the display device of FIG. 1. For convenience of description, the processor is further shown in FIG. 2. FIGS. 3A and 3B are diagrams illustrating an embodiment of an operation of the driving circuit unit of FIG. 2.

Referring to FIGS. 1, 2, 3A, and 3B, the sensor driver 220 may include a first pin PIN1 (or a first terminal), a second pin PIN2 (at least one second a pin, or a second terminal), and a third pin PIN3 (or a third terminal).

The first pin PIN1 of the sensor driver 220 may be connected to the processor through a signal line L_S2. The signal line L_S2 may provide a communication path between the sensor driver 220 and the processor 30. In an embodiment, the sensor driver 220 may is directly connected to the processor 30 through the signal line L_S2. The sensor driver 220 may transmit or receive a signal according to a first interface through the first pin PIN1. The first interface may mean an interface (or a communication interface) between the processor 30 and the sensor driver 220, for example, the first interface may be an inter-integrated circuit (I2C) interface, a serial peripheral interface (SPI) interface, or the like. For example, the sensor driver 220 may output information on an external input (for example, whether the external input occurs, and the coordinate of the external input) through the first pin PIN1.

The second pin PIN2 of the sensor driver 220 may be connected to the signal line L_S1. The signal line L_S1 may connect the display driver 210, the sensor driver 220, and the memory 230, and provide a communication path between the display driver 210, the sensor driver 220, and the memory 230. In an embodiment, the sensor driver 220 may be directly connected to the display driver 210 and/or the memory 230 through one or more lines of the signal line L_S1. The sensor driver 220 may transmit or receive a signal according to a second interface through the second pin PIN2. The second interface may mean an interface between the display driver 210, the sensor driver 220, and the memory 230, and for example, the second interface may be a serial peripheral interface (SPI) interface, but is not limited thereto.

In an embodiment, the second pin PIN2 may include a (2-1)-th pin PIN2-1, a (2-2)-th pin PIN2-2, a (2-3)-th pin PIN2-3, and a (2-4)-th pin PIN2-4.

The (2-1)-th pin PIN2-1 may be connected to a first signal line L_CS and may output a chip select signal CS. For example, when the sensor driver 220 requires access to the memory 230, the chip select signal CS may transit to an activation state, and when the sensor driver 220 does not require access to the memory 230, the chip select signal CS may maintain a deactivation state. The (2-2)-th pin PIN2-2 may be connected to a second signal line L_CLK and may output a clock signal CLK. The clock signal CLK may have a pulse waveform toggled with a preset frequency to recognize a first serial signal SI and a second serial signal SO. The (2-3)-th pin PIN2-3 may be connected to a third signal line L_SI and may output the first serial signal SI. The (2-4)-th pin PIN2-4 may be connected to a fourth signal line L_SO and may receive the second serial signal SO. The first serial signal SI (or a serial input signal) may be a signal corresponding to a command for controlling the memory 230, and the second serial signal SO (or a serial output signal) may be a signal provided from the memory 230 in response to the first serial signal SI. For example, the second serial signal SO may be an acknowledgement acknowledging receipt of the command. For example, the sensor driver 220 may re-send the command if it does not receive the acknowledgement within a certain amount of time.

The third pin PIN3 of the sensor driver 220 may be connected to the display driver 210 through the flag signal line L_F. In an embodiment, the sensor driver 220 is directly connected to the display driver 210 through the flag signal line L_F. The sensor driver 220 may transmit or receive the flag signal FLAG through the third pin PIN3. The flag signal FLAG may be used to determine an access order of the drivers (that is, the sensor driver 220 and the display driver 210) with respect to the memory 230. For example, the sensor driver 220 may output the flag signal FLAG through the third pin PIN3 to access the memory 230. As another example, when the display driver 210 accesses the memory 230, the sensor driver 220 may receive the flag signal FLAG through the third pin PIN3.

Similarly to the sensor driver 220, the display driver 210 may include a second pin and a third pin, may be connected to the memory 230 through the second pin and the signal line L_S1, and may be connected to the sensor driver 220 through the third pin and the flag signal line L_F.

In an embodiment, one of the display driver 210 and the sensor driver 220 may be selectively connected to or access the memory 230 according to the flag signal FLAG, and the other of the display driver 210 and the sensor driver 220 may be in a high impedance (Hi-z) state or a floating state with respect to the signal line L_S1. For example, a connection between an internal circuit of the other of the display driver 210 and the sensor driver 220 and the second pin PIN2 (and the signal line L_S1) may be disconnected by a switch or the like so that data transmitted between the sensor driver 220 and the memory 230 does not collide with data transmitted between the display driver 210 and the memory 230

Referring to FIG. 3A, for example, the display driver 210 may transmit the flag signal FLAG to the sensor driver 220 through the flag signal line L_F, the display driver 210 may be connected to or access the memory 230, and the display driver 210 may load or receive data (for example, the compensation data DATA_COM) from the memory 230. The sensor driver 220 may maintain the second pin PIN2 in the high impedance (Hi-z) state in response to the flag signal FLAG of the display driver 210. For example, when the sensor driver 220 is in the high impedance (Hi-z) state, the chip select signal CS, the clock signal CLK, and the first serial signal SI output through the second pin PIN2 of the sensor driver 220 may have a level corresponding to a high impedance (Hi-z). For example, the sensor driver 220 may disconnect pins PIN2-1, PIN2-2, and PIN2-3 from signal lines L_CS, L_CLK, and L_SI in response to the flag signal FLAG of the display driver 210. In an embodiment, the sensor driver 220 further disconnects pin PIN2-4 from signal line L_SO in response to the flag signal FLAG of the display driver 210. In an alternate embodiment, the sensor driver 220 is constantly connected to the signal line L_S0 regardless of receiving the flag signal FLAG of the display driver 210.

Referring to FIG. 3B, for example, the sensor driver 220 may transmit the flag signal FLAG to the display driver 210 through the flag signal line L_F, the sensor driver 220 may be connected to or access the memory 230, and the sensor driver 220 may load or receive data (for example, the firmware DATA_F/W and the calibration data DATA_CAL) from the memory 230. The display driver 210 may be in a high impedance (Hi-z) state or a floating state with respect to the signal line L_S1 in response to the flag signal FLAG of the sensor driver 220. For example, the display driver 210 may disconnect itself from the signal lines L_CS, L_CLK, and L_SI in response to the flag signal FLAG of the sensor driver 220. In an embodiment, the display driver 210 further disconnects itself from signal line L_S0 in response to the flag signal FLAG of the sensor driver 220. In an alternate embodiment, the display driver 210 is constantly connected to the signal line L_S0 regardless of receiving the flag signal FLAG of the sensor driver 220. As described above, the sensor driver 220 and the display driver 210 may be selectively connected to the memory 230 according to the flag signal FLAG. Therefore, collision between the display driver 210 and the sensor driver 220 may be prevented during the data transmission process with the memory 230, and the display driver 210 and the sensor driver 220 may stably operate.

Figure 4:
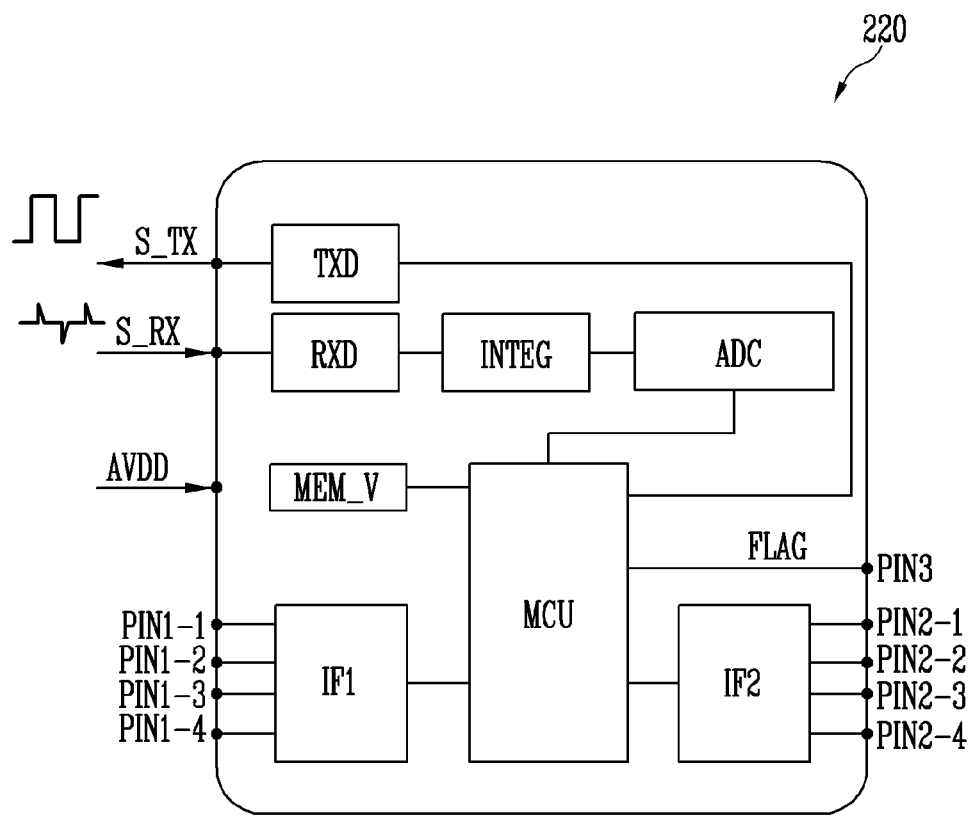
FIG. 4 is a block diagram illustrating an embodiment of a sensor driver included in the display device of FIG. 1.
Figure 5:
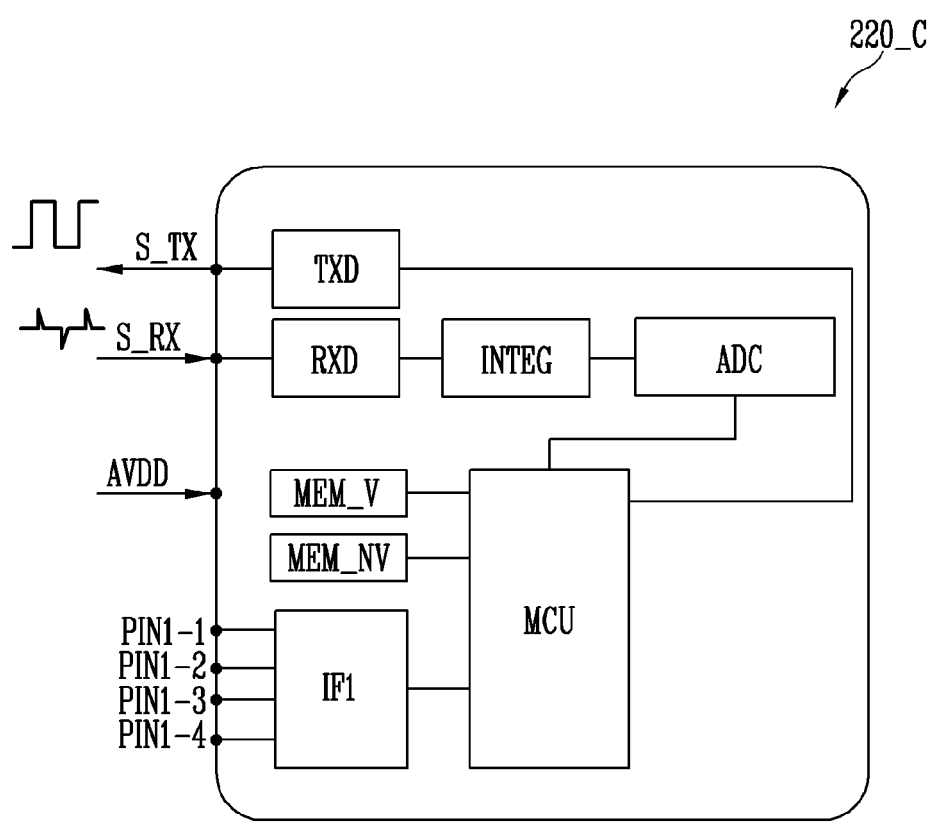
FIG. 5 is a block diagram illustrating a comparative example of the sensor driver included in the display device of FIG. 1.

FIG. 4 is a block diagram illustrating an embodiment of the sensor driver included in the display device of FIG. 1. FIG. 5 is a block diagram illustrating a comparative example of the sensor driver included in the display device of FIG. 1. Compared to the sensor driver 220 of FIG. 4, the sensor driver 220_C according to the comparative embodiment of FIG. 5 further includes a nonvolatile memory MEM_NV, and does not include a second interface unit IF2, and second and third pins PIN2 and PIN3.

Referring to FIGS. 1 to 4, the sensor driver 220 may receive a driving voltage AVDD (or a power voltage) from an external device. The driving voltage AVDD may be a power voltage required for driving the sensor driver 220, and may be provided from the processor 30, a power management integrated circuit (PMIC), or the like. According to an embodiment, a plurality of different driving voltages may be provided to the sensor driver 220.

The sensor driver 220 may include a transmitter TXD, a receiver RXD, an integrator INTEG, an analog-to-digital converter ADC, a controller MCU (e.g., a control circuit), a volatile memory MEM_V, a first interface unit IF1 (e.g., an interface circuit), and a second interface unit IF2 (e.g., an interface circuit). The transmitter TXD and the receiver RXD may be referred to as a transceiver.

The transmitter TXD may output a driving signal S_TX through a driving pin (or a driving terminal). The driving signal S_TX may have a pulse waveform and may be provided to the first sensors TX of FIG. 1. To supply the driving signal S_TX to each of the first sensors TX, a plurality of driving pins may be provided.

The receiver RXD may receive a sensing signal S_RX through a sensing pin (or a sensing terminal). The sensing signal S_RX may be provided from the second sensors RX of FIG. 1 and may have a pulse or impulse waveform corresponding to the driving signal S_TX. To receive the sensing signal S_RX from each of the second sensors RX, a plurality of sensing pins (and the receiver RXD) may be provided. According to an embodiment, the receiver RXD may be implemented as an analog front end.

The integrator INTEG may amplify or integrate the sensing signal S_RX. For example, the integrator INTEG may include an amplifier, and may output the sensing signal S_RX by differentially amplifying the sensing signal S_RX with a reference signal. The reference signal may be a preset signal (for example, a ground signal) or a sensing signal of a channel (or a sensor) adjacent to a channel (or a sensor) to which the sensing signal S_RX is provided.

The analog-to-digital converter ADC may convert an output of the integrator INTEG, that is, a signal of an analog format, into a signal of a digital format, that is, a digital signal.

The controller MCU may analyze the digital signal to detect the external input. In addition, the controller MCU may calculate the coordinate of the external input using the firmware and/or the calibration data. The controller MCU may be implemented by a micro control unit or a microcontroller, but is not limited thereto.

The controller MCU may control an operation of the transmitter TXD. For example, the controller MCU may control a waveform, an output timing, and the like of the driving signal S_TX based on the firmware. Similarly, the controller MCU may control an operation of remaining configurations (for example, the receiver RXD and the like) in the sensor driver 220.

The volatile memory MEM_V may be implemented as a random access memory (RAM), a static RAM (SRAM), or the like, and may store the firmware, the calibration data, and the like loaded from the outside, or store data or the like generated in a process of calculating the coordinate of the external input.

The first interface unit IF1 may be connected between the first pin PIN1 and the controller MCU. The first interface unit IF1 may generate or convert a signal corresponding to the first interface between the processor 30 and the sensor driver 220. For example, the first interface unit IF1 may convert information on the touch input (or the coordinate of the touch input) according to the first interface and transmit the information on the touch input to the processor 30.

The first pin PIN1 may include a plurality of pins. For example, the first pin PIN1 may include a (1-1)-th pin PIN1-1, a (1-2)-th pin PIN1-2, a (1-3)-th pin PIN1-3, and a (1-4)-th pin PIN1-4. For example, when the first interface is an I2C interface, the (1-1)-th pin PIN1-1 may transmit data, the (1-2)-th pin PIN1-2 may transmit a clock signal, the (1-3)-th pin PIN1-3 may transmit an interrupt signal, and the (1-4)-th pin PIN1-4 may transmit a reset signal. However, the disclosure is not limited thereto. When the first interface is the same as the second interface between the sensor driver 220 and the memory 230, functions of the (1-1)-th pin PIN1-1, the (1-2)-th pin PIN1-2, the (1-3)-th PIN1-3, and the (1-4)-th pin PIN1-4 may be substantially identical or similar to functions of the (2-1)-th pin PIN2-1, the (2-2)-th pin PIN2-2, the (2-3)-th PIN2-3, and the (2-4)-th pin PIN2-4, respectively. A signal output through the first pin PIN1 may be variously changed according to the first interface.

The second interface unit IF2 may be connected between the second pin PIN2 and the controller MCU. The second interface unit IF2 may generate or convert a signal corresponding to the second interface between the sensor driver 220 and the memory 230.

In an embodiment, the controller MCU may output the flag signal FLAG indicating an operation state of the second interface unit IF2 of the sensor driver 220 through the third pin PIN3 or receive the flag signal FLAG through the third pin PIN3. For example, when the controller MCU outputs the flag signal FLAG through the third pin PIN3, data may be transmitted through the second interface unit IF2. As another example, when the flag signal FLAG is applied to the third pin PIN3 from the outside, or when the controller MCU receives the flag signal FLAG through the third pin PIN3, the controller MCU may stop an operation of the second interface unit IF2 or disconnect the second interface unit IF2 from the second pin PIN2, to maintain the second pin PIN2 in a high impedance (Hi-z) state. The operation state may be one of a first operation state indicating the sensor driver 220 is currently accessing the memory 230 or the second interface unit IF2 is connected to the second signal pins (e.g., PIN2-1, PIN2-2, PIN2-3, and/or PIN2-4), a second operation state indicating the sensor driver 220 is not currently accessing the memory 230 or the second interface unit IF2 is disconnected from the second signal pins (e.g., PIN2-1, PIN2-2, PIN2-3, and/or PIN2-4), or a third operation state indicating the sensor driver 220 is not currently accessing the memory 230 but desires to begin accessing the memory 230.

In an embodiment, when the sensor driver 220 is initially driven (for example, when the display device is powered-on or booted), the controller MCU may receive the firmware (and the calibration data) from the memory 230 through the second interface unit IF2 and store the firmware (and the calibration data) in the volatile memory MEM_V. That is, when the sensor driver 220 is initially driven, the controller MCU may load the firmware (and the calibration data) from the memory 230 into the volatile memory MEM_V. Thereafter, the sensor driver 220 may perform a sensing operation for the external input based on the firmware loaded into the volatile memory MEM_V, or may control the sensor unit 120 (refer to FIG. 1) for the sensing operation.

In an embodiment, the sensor driver 220 does not include a nonvolatile memory MEM_NV. That is, compared to a sensor driver 220_C according to the comparative embodiment of FIG. 5, the sensor driver 220 does not include the nonvolatile memory MEM_NV.

The sensor driver 220_C of FIG. 5 always includes the nonvolatile memory MEM_NV, for example, a flash memory to store the firmware (and the calibration data).

However, the flash memory, a digital block (for example, the controller MCU), and an analog block (for example, the receiver RXD, the integrator INTEG, or the like) may be formed through different processes, for example, the flash memory may be formed through a 65 nm process, the digital block may be formed through a 100 nm process, and the analog block may be formed through a 350 nm process. When the sensor driver 220 does not include the nonvolatile memory MEM_NV such as a flash memory, a manufacturing process of the sensor driver 220 may be simplified and the manufacturing cost of the sensor driver 220 may be reduced.

In addition, the firmware (and the calibration data) may be stored in the memory 230 (an external memory, or a memory provided for the display driver 210 in advance) instead of the nonvolatile memory MEM_NV, and the sensor driver 220 may load the firmware from the memory 230 into the internal volatile memory MEM_V. To this end, compared to the sensor driver 220_C of FIG. 5, the sensor driver 220 of FIG. 4 may further include the second interface unit IF2, the second pin PIN2, and the third pin PIN3. Therefore, the sensor driver 220 may normally perform the sensing operation for the external input based on the firmware.

As described above, the sensor driver 220 does not include the nonvolatile memory MEM_NV, and may include the second interface unit IF2 (and the second pin PIN2) for loading the firmware (and the calibration data) and the third pin PIN3 transmitting the flag signal FLAG.

Figure 6:
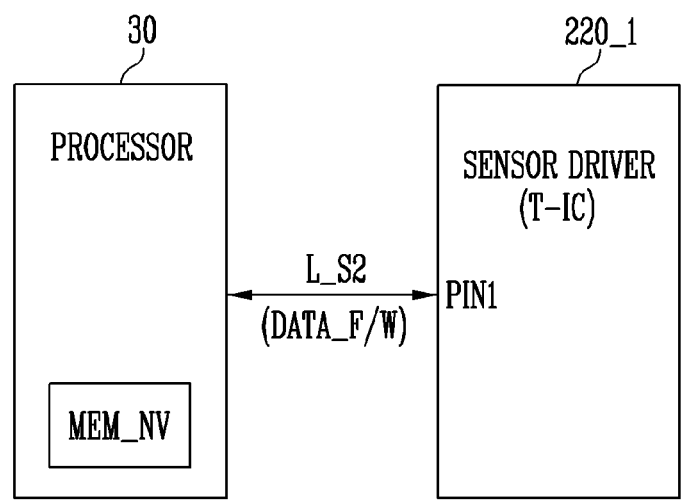
FIG. 6 is a block diagram illustrating an embodiment of the sensor driver included in the display device of FIG. 1.

FIG. 6 is a block diagram illustrating an embodiment of the sensor driver included in the display device of FIG. 1. For convenience of description, the processor 30 is further shown in FIG. 6.

Referring to FIGS. 1, 2, 4 and 6, since the sensor driver 220_1 of FIG. 6 may be substantially identical or similar to the sensor driver 220 of FIG. 4 (and FIG. 2), an overlapping description is not repeated.

The sensor driver 220_1 does not include the nonvolatile memory MEM_NV.

Meanwhile, the processor 30 includes the nonvolatile memory MEM_NV. Firmware DATA_F/W for the sensor driver 220_1 may be stored in the nonvolatile memory MEM_NV. According to an embodiment, calibration data for the sensor driver 220_1 may be further stored in the nonvolatile memory MEM_NV.

In this case, when the sensor driver 220_1 is initially driven, the sensor driver 220_1 may load the firmware DATA_F/W (and the calibration data) from the nonvolatile memory MEM_NV of the processor 30 through the signal line L_S2. In an embodiment, the processor 30 is directly connected to the sensor driver 220_1 through the signal line L_S2.

Even in a case in which the firmware DATA_F/W is stored in the processor 30, the nonvolatile memory MEM_NV such as a flash memory may be excluded from the sensor driver 220_1, and thus a manufacturing process of the sensor driver 220_1 may be simplified and a manufacturing cost of the sensor driver 220_1 may be reduced.

According to an embodiment, when data for the sensor driver 220_1 (for example, data that is required to drive the sensor driver 220_1 and required to be stored in the nonvolatile memory, such as the calibration data) is stored in the nonvolatile memory MEM_NV of the processor 30, in addition to the firmware DATA_F/W, the sensor driver 220_1 is not required to be connected to the memory 230 (refer to FIG. 1), and the sensor driver 220_1 may not include the second interface unit IF2, the second pin PIN2, and the third pin PIN3 of FIG. 4. In this case, the manufacturing cost of the sensor driver 220_1 may be further reduced.

Figure 7:
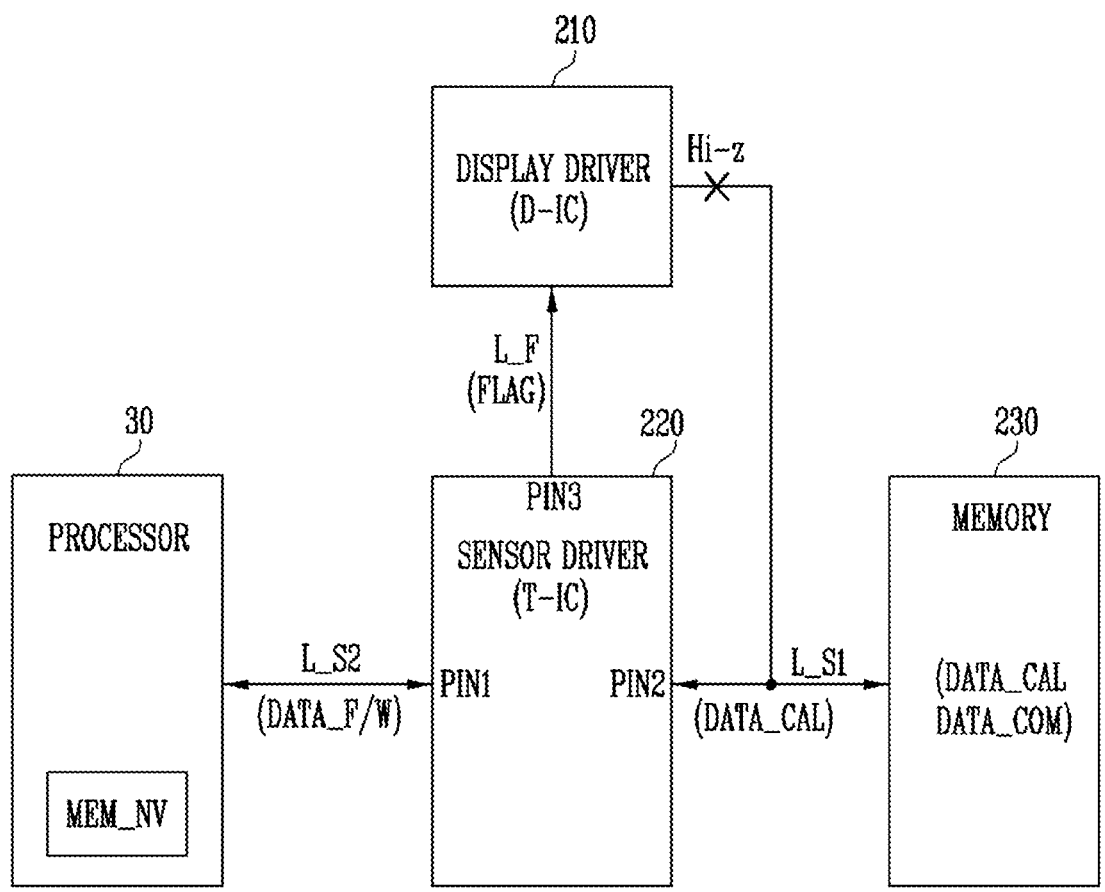
FIG. 7 is a diagram illustrating an embodiment of the operation of the driving circuit unit of FIG. 2.

FIG. 7 is a diagram illustrating an embodiment of the operation of the driving circuit unit of FIG. 2. For convenience of description, the processor 30 is further shown in FIG. 7.

Referring to FIGS. 1, 2, 6, and 7, the driving circuit unit 20 of FIG. 7 is substantially identical or similar to the driving circuit unit 20 of FIG. 2, and thus an overlapping description is not repeated.

Data for the sensor driver 220, for example, the firmware DATA_F/W, may be stored in the nonvolatile memory MEM_NV of the processor 30.

In this case, when the sensor driver 220 is initially driven, the sensor driver 220 may load the firmware DATA_F/W from the nonvolatile memory MEM_NV of the processor 30 through the signal line L_S2.

Meanwhile, another data for the sensor driver 220, for example, the calibration data DATA_CAL, may be stored in the memory 230.

In this case, as described with reference to FIG. 3B, the sensor driver 220 may transmit the flag signal FLAG to the display driver 210 through the flag signal line L_F, the sensor driver 220 may be connected to or access the memory 230, and the sensor driver 220 may load the calibration data DATA_CAL from the memory 230. The display driver 210 may be in a high impedance (Hi-z) state or a floating state with respect to the signal line L_S1 in response to the flag signal FLAG of the sensor driver 220.

As described above, the sensor driver 220 may load the firmware DATA_F/W from the processor 30 and load the calibration data DATA_CAL from the memory 230.

Meanwhile, in FIG. 7, the firmware DATA F/W is stored in the processor 30 and the calibration data DATA_CAL is stored in the memory 230, but the disclosure is not limited thereto. For example, the calibration data DATA_CAL may be stored in the processor 30 and the firmware DATA F/W may be stored in the memory 230.

Figure 8:
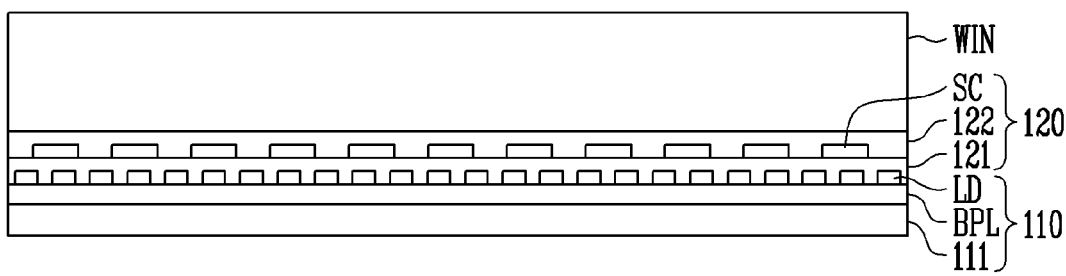
FIG. 8 is a cross-sectional view illustrating an embodiment of the display device of FIG. 1.

FIG. 8 is a cross-sectional view illustrating an embodiment of the display device of FIG. 1.

Referring to FIGS. 1 and 8, the sensor unit 120 may be stacked on the display unit 110. According to an embodiment, a window WIN may be stacked on the sensor unit 120.

The display unit 110 may include a display substrate 111, a circuit element layer BPL formed on the display substrate 111, and a light emitting element LD formed on the circuit element layer BPL. The circuit element layer BPL may include pixel circuits (for example, a transistor and a capacitor) for driving the light emitting element LD of the pixels PX, the scan lines SL, the data lines DL, and the like.

The sensor unit 120 may include a sensor substrate 121, sensors SC (e.g., touch electrodes) formed on the sensor substrate 121, and a protective layer 122 covering the sensors SC. In an embodiment of FIG. 8, the sensor substrate 121 is shown in a form of an encapsulation layer covering the pixels PX. In another embodiment, the sensor substrate 121 may exist separately from the encapsulation layer covering the pixels PX.

The window WIN is a protective member disposed at the uppermost end of a module of the display device 1, and may be a substantially transparent light-transmitting substrate. The window WIN may have a multiple layer structure such as a glass substrate, a plastic film, or a plastic substrate. The window WIN may include a rigid or flexible substrate, but a configuration material of the window WIN is not particularly limited. Although not shown, the display device 1 may further include a polarizing plate (or another type of anti-reflection layer) for preventing external light between the window WIN and the sensor unit 120.

Figure 9:
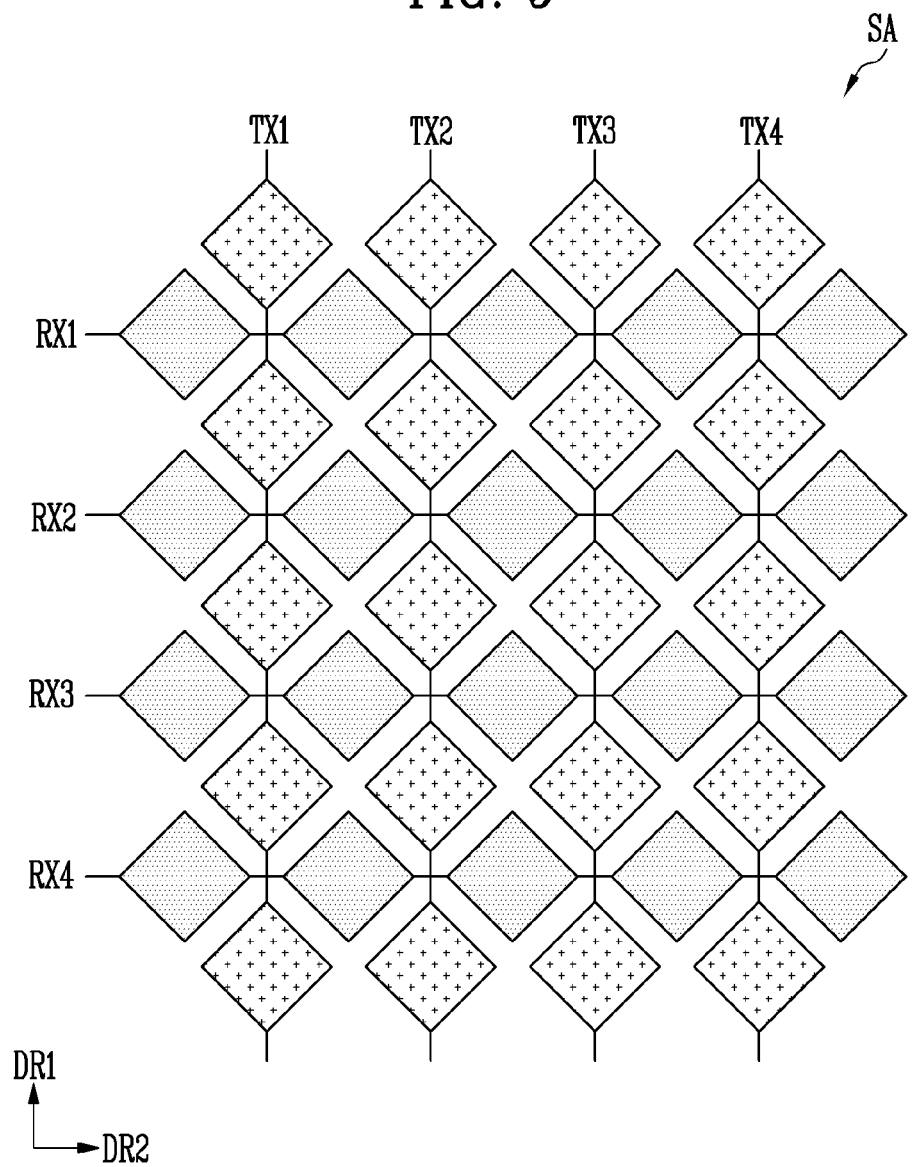
FIG. 9 is a diagram illustrating an embodiment of sensors included in the display device of FIG. 8.

FIG. 9 is a diagram illustrating an embodiment of the sensors included in the display device of FIG. 8.

Referring to FIGS. 1, 8, and 9, first sensors TX1, TX2, TX3, and TX4 and second sensors RX1, RX2, RX3, and RX4 positioned in the sensing area SA are shown as an example. For convenience of description, it is assumed that four first sensors TX1 to TX4 are disposed in the sensing area SA, and four second sensors RX1 to RX4 are disposed in the sensing area SA. In the actual display device 1, tens to hundreds of first and second sensors TX and RX may be disposed.

Since a description of the first sensors TX1 to TX4 and the second sensors RX1 to RX4 is the same as the description of the first sensors TX and the second sensors RX of FIG. 1, an overlapping description is omitted.

Figure 10:
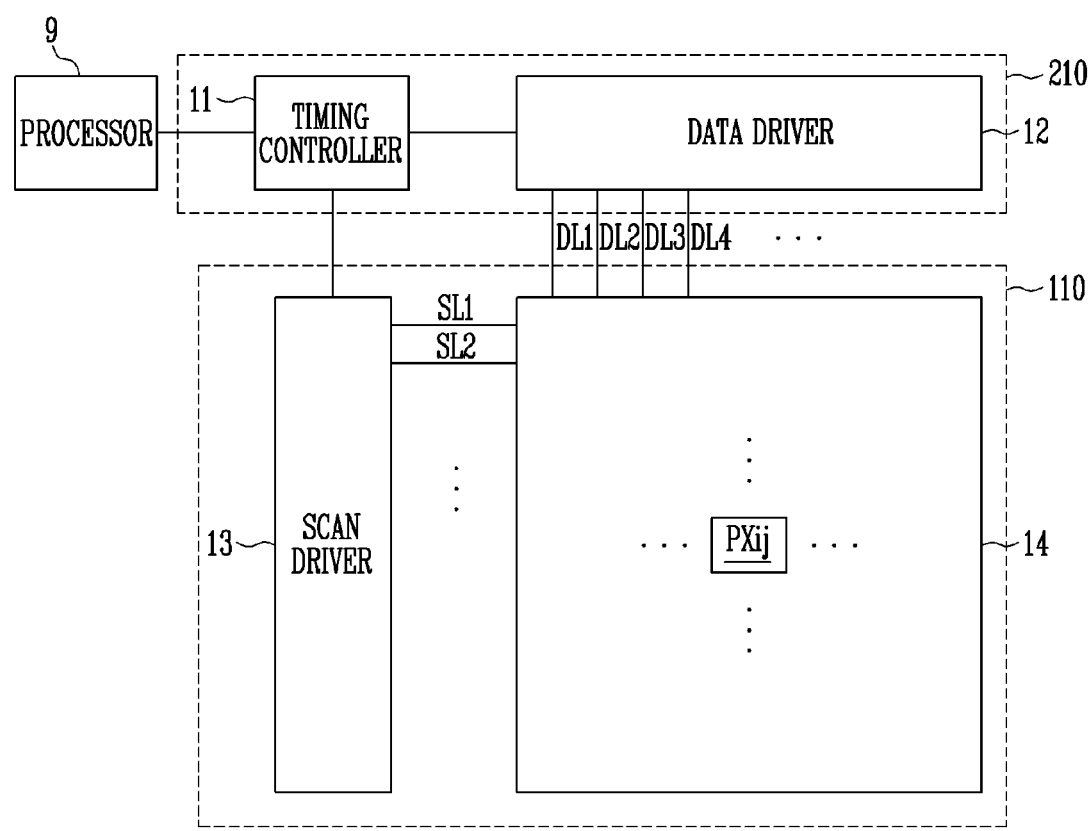
FIG. 10 is a diagram illustrating an embodiment of a display unit and a display driver of FIG. 1.

FIG. 10 is a diagram illustrating an embodiment of the display unit and the display driver of FIG. 1.

Referring to FIGS. 1 and 10, the display driver 210 may include the data driver 12 and the timing controller 11, and the display 110 may include the scan driver 13. However, as described above, whether each functional unit is integrated into one IC, integrated into a plurality of ICs, or mounted on the display substrate 111 may be variously configured according to a specification of the display device 1.

The timing controller 11 may receive grayscales and timing signals for each display frame period from a processor 9. Here, the processor 9 may correspond to at least one of a graphics processing unit (GPU), a central processing unit (CPU), an application processor (AP), and the like. For example, the processor 9 may be the processor 30 of FIG. 1. The timing signals may include a vertical synchronization signal, a horizontal synchronization signal, a data enable signal, and the like.

Each cycle of the vertical synchronization signal may correspond to each display frame period. Each cycle of the horizontal synchronization signal Hsync may correspond to each horizontal period. The grayscales may be supplied in horizontal line unit in each horizontal period in response to a pulse of an enable level of the data enable signal. A horizontal line may mean pixels (for example, a pixel row) connected to the same scan line.

The timing controller 11 may render the grayscales to correspond to the specification of the display device 1 (or the pixel unit 14). For example, the processor 9 may provide a red grayscale, a green grayscale, and a blue grayscale for each unit dot. For example, when the pixel unit 14 has an RGB stripe structure, the pixel may correspond to each grayscale one-to-one. In this case, rendering of the grayscales may not be required. However, for example, when the pixel unit 14 has a PENTILE™ structure, since adjacent unit dots share the pixel, the pixel need not correspond to each grayscale one-to-one. In this case, rendering of the grayscales may be required. The rendered or non-rendered grayscales may be provided to the data driver 12. In addition, the timing controller 11 may provide a data control signal to the data driver 12. In addition, the timing controller 11 may provide a scan control signal to the scan driver 13.

The data driver 12 may generate data voltages to be provided to data lines DL1, DL2, DL3, and DL4 using the grayscales and the data control signal received from the timing controller 11.

The scan driver 13 may generate scan signals to be provided to scan lines SL1 and SL2 using a clock signal, a scan start signal, and the like received from the timing controller 11. The scan driver 13 may sequentially supply scan signals having a turn-on level of pulse to the scan lines SL1 and SL2. For example, the scan driver 13 may supply turn-on level of scan signals to the scan lines at a cycle corresponding to the cycle of the horizontal synchronization signal during an active period in which the grayscales are supplied. The scan driver 13 may include scan stages configured in a form of a shift register. The scan driver 13 may generate the scan signals in a method of sequentially transferring a scan start signal having a turn-on level of pulse form to a next scan stage according to control of the clock signal.

The pixel unit 14 may include the pixels. Each of the pixels may be connected to corresponding data line and scan line. For example, the pixel PXij may be connected to an i-th scan line and a j-th data line. The pixels may include pixels emitting light of a first color, pixels emitting light of a second color, and pixels emitting light of a third color. The first color, the second color, and the third color may be different colors. For example, the first color may be one of red, green, and blue, the second color may be one other than the first color among red, green, and blue, and the third color may be the other color other than the first color and the second color among red, green, and blue. In addition, magenta, cyan, and yellow may be used as the first to third colors instead of red, green, and blue.

Figure 11:
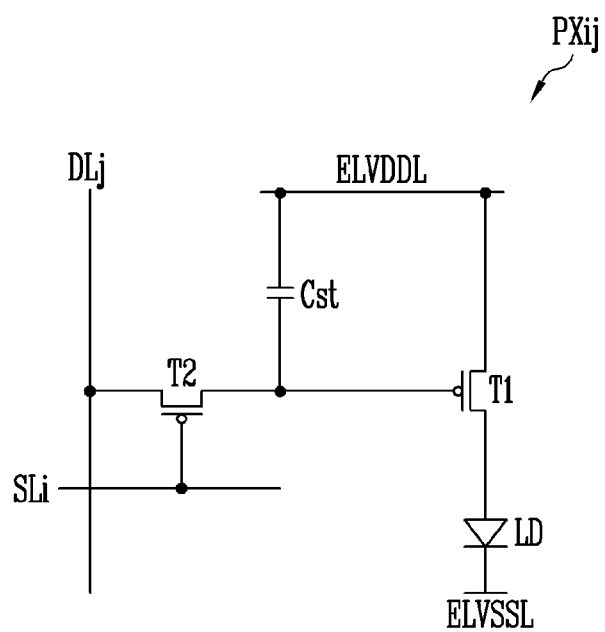
FIG. 11 is a diagram illustrating an embodiment of a pixel included in a display unit of FIG. 10.

FIG. 11 is a diagram illustrating an embodiment of the pixel included in the display unit of FIG. 10.

Referring to FIGS. 10 and 11, an exemplary pixel PXij is shown. Since other pixels may also have substantially the same configuration, an overlapping description is omitted.

The pixel PXij includes a first transistor T1, a second transistor T2, a capacitor Cst and a light emitting element LD. A gate electrode of the first transistor T1 may be connected to a second electrode of the storage capacitor Cst, a first electrode of the first transistor T1 may be connected to a first power line ELVDDL, and a second electrode of the first transistor T1 may be connected to an anode of the light emitting element LD. The first transistor T1 may be referred to as a driving transistor.

A gate electrode of the second transistor T2 may be connected to the i-th scan line SLi, a first electrode of the second transistor T2 may be connected to the j-th data line DLL and a second electrode of the second transistor T2 may be connected to the second electrode of the storage capacitor Cst. The second transistor T2 may be referred to as a scan transistor.

A first electrode of the storage capacitor Cst may be connected to the first power line ELVDDL, and the second electrode of the storage capacitor Cst may be connected to the gate electrode of the first transistor T1. In other words, the storage capacitor Cst may be formed between the first power line ELVDDL and the gate electrode of the first transistor T1.

The anode of the light emitting element LD may be connected to the second electrode of the first transistor T1 and a cathode may be connected to a second power line ELVSSL. The light emitting element LD may be a light emitting diode. As described above, the light emitting element LD of each pixel may be configured of an organic light emitting element, an inorganic light emitting element, a quantum dot/well light emitting element, and the like. In addition, a plurality of light emitting elements may be provided in each pixel. At this time, the plurality of light emitting elements may be connected in series, parallel, series-parallel, or the like. During an emission period of the light emitting element LD, a first power voltage applied to the first power line ELVDDL may be greater than a second power voltage applied to the second power line ELVSSL.

Here, the first and second transistors T1 and T2 are shown as P-type transistors, but those skilled in the art may use at least one transistor by inverting a polarity of a signal to replace at least one transistor with an N-type transistor.

When a scan signal of a turn-on level is applied to the i-th scan line SLi, the second transistor T2 may be turned on. At this time, a data voltage charged in the j-th data line DLj may be stored in the storage capacitor Cst. The first transistor T1 may flow a driving current in response to a gate-source voltage difference maintained by the storage capacitor Cst. The driving current may flow through a path of the first power line ELVDDL, the first transistor T1, the light emitting element LD, and the second power line ELVSSL. The light emitting element LD may emit light with a luminance corresponding to an amount of the driving current.

However, a structure and a driving method of the pixel PXij may be variously changed. For example, the pixel PXij may further include other circuit elements such as a compensation transistor for compensating for a threshold voltage or the like of the first transistor T1, an initialization transistor for initializing the gate electrode of the first transistor T1 and/or the anode electrode of the light emitting element LD, an emission control transistor for controlling a period in which the driving current is supplied to the light emitting element LD, and/or a boosting capacitor for boosting a voltage of the gate electrode of the first transistor T1.

Figure 12:
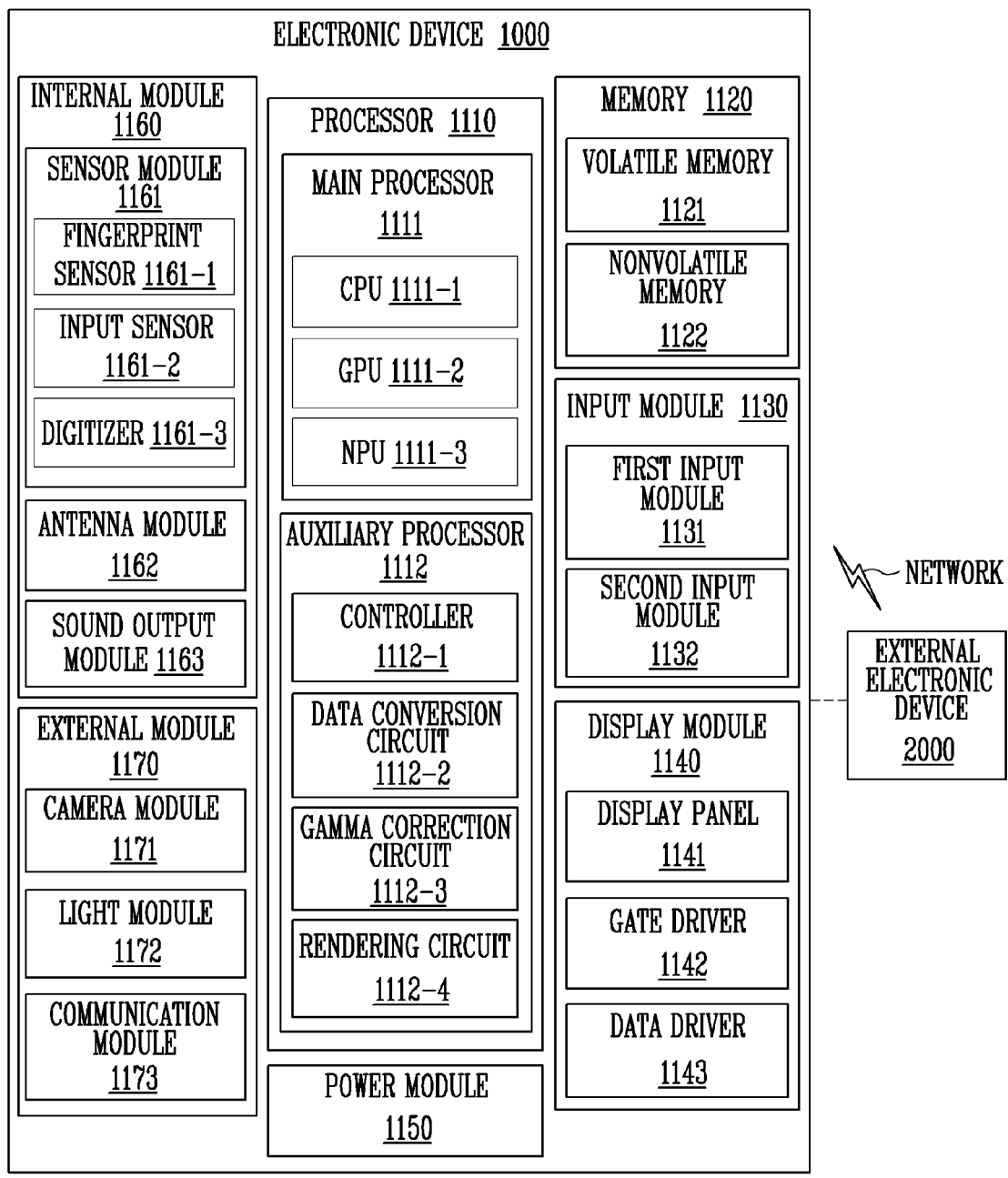
FIG. 12 is a diagram illustrating an electronic device to which a display device according to embodiments of the disclosure may be applied.

FIG. 12 is a diagram illustrating an electronic device to which a display device according to embodiments of the disclosure may be applied.

The electronic device 1000 may output various pieces of information through a display module 1140 within an operating system. The display module 1140 may correspond to at least a portion of the display device 1 of FIG. 1. When a processor 1110 executes an application stored in a memory 1120, the display module 1140 may provide application information to a user through a display panel 1141. The processor 1110 may correspond to the processor 30 of FIG. 1 (and the timing controller 11 of FIG. 10), and the display panel 1141 may correspond to the display unit 110 of FIG. 1.

The processor 1110 may obtain an external input through an input module 1130 or a sensor module 1161 and execute an application corresponding to the external input. At least a portion of the sensor module 1161 may correspond to the input sensing device of FIG. 1 (that is, the sensor unit 120 and the sensor driver 220). For example, when the user selects a camera icon displayed on the display panel 1141, the processor 1110 may obtain a user input through an input sensor 1161-2 and activate a camera module 1171. The processor 1110 may transmit image data corresponding to a captured image obtained through the camera module 1171 to the display module 1140. The display module 1140 may display an image corresponding to the captured image through the display panel 1141.

As another example, when personal information authentication is executed in the display module 1140, a fingerprint sensor 1161-1 may obtain input fingerprint information as input data. The processor 1110 may compare input data obtained through the fingerprint sensor 1161-1 with authentication data stored in a memory 1120 to generate a comparison result and execute an application according to the comparison result. The display module 1140 may display information executed according to a logic of the application through the display panel 1141.

As still another example, when a music streaming icon displayed on the display module 1140 is selected, the processor 1110 may obtain a user input through the input sensor 1161-2 and activate a music streaming application stored in the memory 1120. When a music execution command is input in the music streaming application, the processor 1110 may activate a sound output module 1163 to provide sound information corresponding to the music execution command to the user.

In the above, an operation of the electronic device 1000 is briefly described. Hereinafter, a configuration of the electronic device 1000 is described in detail. Some of configurations of the electronic device 1000 to be described later may be integrated and provided as one configuration, and one configuration may be separated into two or more configurations and provided.

Referring to FIG. 12, the electronic device 1000 may communicate with an external electronic device 2000 through a network (for example, a short-range wireless communication network or a long-range wireless communication network). According to an embodiment, the electronic device 1000 may include a processor 1110, a memory 1120, an input module 1130, a display module 1140, a power module 1150, a built-in module 1160, and an external module 1170. According to an embodiment, in the electronic device 1000, at least one of the above-described components may be omitted or one or more other components may be added. According to an embodiment, some of the above-described components (for example, the sensor module 1161, an antenna module 1162, or the sound output module 1163) may be integrated into another component (for example, the display module 1140).

The processor 1110 may execute software to control at least one other component (for example, a hardware or software component) of the electronic device 1000 connected to the processor 1110, and perform various data processing or operations. According to an embodiment, as at least a portion of the data processing or operation, the processor 1110 may store a command or data received from another component (for example, the input module 1130, the sensor module 1161, or a communication module 1173) in a volatile memory 1121 and process the command or the data stored in the volatile memory 1121, and result data may be stored in a nonvolatile memory 1122. The nonvolatile memory 1122 may correspond to the memory 230 of FIG. 2.

The processor 1110 may include a main processor 1111 and an auxiliary processor 1112. The main processor 1111 may correspond to the processor 30 of FIG. 1, and the auxiliary processor 1112 may correspond to the driving circuit unit 20 of FIG. 1.

The main processor 1111 may include one or more of a central processing unit (CPU) 1111-1 or an application processor (AP). The main processor 1111 may further include any one or more of a graphic processing unit (GPU) 1111-2, a communication processor (CP), and an image signal processor (ISP). The main processor 1111 may further include a neural processing unit (NPU) 1111-3. The NPU is a processor specialized in processing an artificial intelligence model, and the artificial intelligence model may be generated through machine learning. The artificial intelligence model may include a plurality of artificial neural network layers. The artificial neural network may be one of a deep neural network (DNN), a convolutional neural network (CNN), a recurrent neural network (RNNs), a restricted boltzmann machine (RBM), a deep belief network (DBN), a bidirectional recurrent deep neural network (BRDNN), a deep Q-network, or a combination of two or more of the above, but is not limited to the above-described example. Additionally or alternatively, the artificial intelligence model may include a software structure in addition to a hardware structure. At least two of the above-described processing units and processors may be implemented as one integrated configuration (for example, a single chip), or each may be implemented as an independent configuration (for example, a plurality of chips).

The auxiliary processor 1112 may include a controller 1112-1. The controller 1112-1 may include an interface conversion circuit and a timing control circuit. The controller 1112-1 may receive an image signal from the main processor 1111, convert a data format of the image signal to meet an interface specification with the display module 1140, and output image data. The controller 1112-1 may output various control signals necessary for driving the display module 1140.

The auxiliary processor 1112 may further include a data conversion circuit 1112-2, a gamma correction circuit 1112-3, and a rendering circuit 1112-4. The data conversion circuit 1112-2 may receive the image data from the controller 1112-1, compensate the image data to display an image with a desired luminance according to a characteristic of the electronic device 1000 or a setting of the user, or convert the image data for reduction of power consumption, afterimage compensation, or the like. The gamma correction circuit 1112-3 may convert the image data, a gamma reference voltage, or the like so that the image displayed on the electronic device 1000 has a desired gamma characteristic. The rendering circuit 1112-4 may receive the image data from the controller 1112-1 and render the image data in consideration of a pixel disposition or the like of the display panel 1141 applied to the electronic device 1000. At least one of the data conversion circuit 1112-2, the gamma correction circuit 1112-3, and the rendering circuit 1112-4 may be integrated into another component (for example, the main processor 1111 or the controller 1112-1). At least one of the data conversion circuit 1112-2, the gamma correction circuit 1112-3, and the rendering circuit 1112-4 may be integrated into a data driver 1143 to be described later.

The memory 1120 may store various data used by at least one component (for example, the processor 1110 or the sensor module 1161) of the electronic device 1000, and input data or output data for a command related thereto. The memory 1120 may include at least one of the volatile memory 1121 and the nonvolatile memory 1122.

The input module 1130 may receive a command or data to be used by a component (for example, the processor 1110, the sensor module 1161, or the sound output module 1163) of the electronic device 1000 from an outside (for example, the user or the electronic device 1000) of the electronic device 2000.

The input module 1130 may include a first input module 1131 to which a command or data is input from the user and a second input module 1132 to which a command or data is input from the external electronic device 2000. The first input module 1131 may include a microphone, a mouse, a keyboard, a key (for example, a button), or a pen (for example, a passive pen or an active pen). The second input module 1132 may support a designated protocol capable of connecting to the external electronic device 2000 by wire or wirelessly. According to an embodiment, the second input module 1132 may include a high definition multimedia interface (HDMI), a universal serial bus (USB) interface, an SD card interface, or an audio interface. The second input module 1132 may include a connector capable of physically connecting to the external electronic device 2000, for example, an HDMI connector, a USB connector, an SD card connector, or an audio connector (for example, a headphone connector).

The display module 1140 may visually provide information to the user. The display module 1140 may include a display panel 1141, a gate driver 1142, and a data driver 1143. The gate driver 1142 and the data driver 1143 may correspond to the scan driver 13 and the data driver 12 of FIG. 10, respectively. The display module 1140 may further include a window, a chassis, and a bracket for protecting the display panel 1141.

The display panel 1141 may include a liquid crystal display panel, an organic light emitting display panel, or an inorganic light emitting display panel, and a type of the display panel 1141 is not particularly limited. The display panel 1141 may be a rigid type or a flexible type that may be rolled or folded. The display module 1140 may further include a supporter, a bracket, a heat dissipation member, or the like that supports the display panel 1141.

The gate driver 1142 may be mounted on the display panel 1141 as a driving chip. In addition, the gate driver 1142 may be integrated in the display panel 1141. For example, the gate driver 1142 may include an amorphous silicon TFT gate driver circuit (ASG), a low temperature polycrystaline silicon (LTPS) TFT gate driver circuit, or an oxide semiconductor TFT gate driver circuit (OSG) built in the display panel 1141. The gate driver 1142 may receive a control signal from the controller 1112-1 and output scan signals to the display panel 1141 in response to the control signal.

The display panel 1141 may further include an emission driver. The emission driver may output an emission control signal to the display panel 1141 in response to a control signal received from the controller 1112-1. The emission driver may be formed separately from the gate driver 1142 or may be integrated into the gate driver 1142.

The data driver 1143 may receive a control signal from the controller 1112-1, convert image data into an analog voltage (for example, a data voltage) in response to the control signal, and then output the data voltages to the display panel 1141.

The data driver 1143 may be integrated into another component (for example, the controller 1112-1). A function of the interface conversion circuit and the timing control circuit of the controller 1112-1 described above may be integrated into the data driver 1143.

The display module 1140 may further include an emission driver, a voltage generation circuit, and the like. The voltage generation circuit may output various voltages necessary for driving the display panel 1141.

The power module 1150 may supply power to a component of the electronic device 1000. The power module 1150 may include a battery that charges a power voltage. The battery may include a non-rechargeable primary cell, a rechargeable secondary cell or fuel cell. The power module 1150 may include a power management integrated circuit (PMIC). The PMIC may supply optimized power to each of the above-described modules and modules to be described later. The power module 1150 may include a wireless power transmission/reception member electrically connected to the battery. The wireless power transmission/reception member may include a plurality of antenna radiators of a coil form.

The electronic device 1000 may further include an internal module 1160 and an external module 1170. The internal module 1160 may include the sensor module 1161, the antenna module 1162, and the sound output module 1163. The external module 1170 may include the camera module 1171, a light module 1172, and the communication module 1173.

The sensor module 1161 may sense an input by a body of the user or an input by a pen among the first input module 1131, and may generate an electrical signal or a data value corresponding to the input. The sensor module 1161 may include at least one of a fingerprint sensor 1161-1, an input sensor 1161-2, and a digitizer 1161-3.

The fingerprint sensor 1161-1 may generate a data value corresponding to a fingerprint of the user. The fingerprint sensor 1161-1 may include any one of an optical type fingerprint sensor or a capacitive type fingerprint sensor.

The input sensor 1161-2 may generate a data value corresponding to coordinate information of the input by the body of the user or the pen. The input sensor 1161-2 may generate a capacitance change amount due to the input as the data value. The input sensor 1161-2 may sense an input by the passive pen or may transmit/receive data to and from the active pen.

The input sensor 1161-2 may measure a biometric signal such as blood pressure, water, or body fat. For example, when the user touches a sensor layer or a sensing panel with a body part and does not move during a certain time, the input sensor 1161-2 may sense the biometric signal based on a change of an electric field by the body part and output information desired by the user to the display module 1140.

The digitizer 1161-3 may generate a data value corresponding to coordinate information of the input by the pen. The digitizer 1161-3 may generate an electromagnetic change amount by the input as the data value. The digitizer 1161-3 may sense the input by a passive pen or may transmit/receive data to and from the active pen.

At least one of the fingerprint sensor 1161-1, the input sensor 1161-2, and the digitizer 1161-3 may be implemented as the sensor layer formed on the display panel 1141 through a continuous process. The fingerprint sensor 1161-1, the input sensor 1161-2, and the digitizer 1161-3 may be disposed above the display panel 1141, and any one of the fingerprint sensor 1161-1, the input sensor 1161-2, and the digitizer 1161-3, for example, the digitizer 1161-3 may be disposed below the display panel 1141.

At least two of the fingerprint sensor 1161-1, the input sensor 1161-2, and the digitizer 1161-3 may be formed to be integrated into one sensing panel through the same process. When at least two of the fingerprint sensor 1161-1, the input sensor 1161-2, and the digitizer 1161-3 are integrated into one sensing panel, the sensing panel may be disposed between the display panel 1141 and a window disposed above the display panel 1141. According to an embodiment, the sensing panel may be disposed on the window, and a position of the sensing panel is not particularly limited.

At least one of the fingerprint sensor 1161-1, the input sensor 1161-2, and the digitizer 1161-3 may be embedded in the display panel 1141. That is, at least one of the fingerprint sensor 1161-1, the input sensor 1161-2, and the digitizer 1161-3 may be simultaneously formed through a process of forming elements (for example, a light emitting element, a transistor, and the like) included in the display panel 1141.

In addition, the sensor module 1161 may generate an electrical signal or a data value corresponding to an internal state or an external state of the electronic device 1000. The sensor module 1161 may further include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The antenna module 1162 may include one or more antennas for transmitting a signal or power to an outside or receiving a signal or power from an outside. According to an embodiment, the communication module 1173 may transmit a signal to an external electronic device or receive a signal from an external electronic device through an antenna suitable for a communication method. An antenna pattern of the antenna module 1162 may be integrated into one configuration (for example, the display panel 1141) of the display module 1140 or the input sensor 1161-2.

The sound output module 1163 is a device for outputting a sound signal to an outside of the electronic device 1000, and may include, for example, a speaker used for general purposes such as multimedia playback or recording playback, and a receiver used exclusively for receiving a call. According to an embodiment, the receiver may be formed integrally with or separately from the speaker. A sound output pattern of the sound output module 1163 may be integrated into the display module 1140.

The camera module 1171 may capture a still image and/or a moving image. According to an embodiment, the camera module 1171 may include one or more lenses, an image sensor, or an image signal processor. The camera module 1171 may further include an infrared camera capable of measuring presence or absence of the user, a position of the user, a gaze of the user, and the like.

The light module 1172 may provide light. The light module 1172 may include a light emitting diode or a xenon lamp. The light module 1172 may operate in conjunction with the camera module 1171 or may operate independently.

The communication module 1173 may support establishment of a wired or wireless communication channel between the electronic device 1000 and the external electronic device 2000 and communication performance through the established communication channel. The communication module 1173 may include any one or both of a wireless communication module such as a cellular communication module, a short-range wireless communication module, or a global navigation satellite system (GNSS) communication module, and a wired communication module such as a local area network (LAN) communication module or a power line communication module. The communication module 1173 may communicate with the external electronic device 2000 through a short-range communication network such as Bluetooth, WiFi direct, or infrared data association (IrDA), or a long-range communication network such as a cellular network, the Internet, or a computer network (for example, LAN or WAN). The above-described various types of communication modules 1173 may be implemented as a single chip or as separate chips.

The input module 1130, the sensor module 1161, the camera module 1171, and the like may be used to control an operation of the display module 1140 in conjunction with the processor 1110.

The processor 1110 may output a command or data to the display module 1140, the sound output module 1163, the camera module 1171, or the light module 1172 based on input data received from the input module 1130. For example, the processor 1110 may generate image data in response to the input data applied through a mouse, an active pen, or the like and output the image data to the display module 1140, or generate command data in response to the input data and output the command data to the camera module 1171 or the light module 1172. When the input data is not received from the input module 1130 during a certain time, the processor 1110 may convert an operation mode of the electronic device 1000 to a low power mode or a sleep mode to reduce power consumed in the electronic device 1000.

The processor 1110 may output a command or data to the display module 1140, the sound output module 1163, the camera module 1171, or the light module 1172 based on sensing data received from the sensor module 1161. For example, the processor 1110 may compare authentication data applied by the fingerprint sensor 1161-1 with authentication data stored in the memory 1120 and then execute an application according to a comparison result. The processor 1110 may execute the command based on sensing data sensed by the input sensor 1161-2 or the digitizer 1161-3 or output corresponding image data to the display module 1140. When the sensor module 1161 includes a temperature sensor, the processor 1110 may receive temperature data for a measured temperature from the sensor module 1161 and further perform luminance correction or the like on the image data based on the temperature data.

The processor 1110 may receive measurement data for the presence of the user, the position of the user, the gaze of the user, and the like, from the camera module 1171. The processor 1110 may further perform luminance correction or the like on the image data based on the measurement data. For example, the processor 1110 determining the presence or absence of the user through an input from the camera module 1171 may output image data of which luminance is corrected through the data conversion circuit 1112-2 or the gamma correction circuit 1112-3 to the display module 1140.

Some of the above-described components may be connected to each other through a communication method between peripheral devices, for example, a bus, general purpose input/output (GPIO), a serial peripheral interface (SPI), a mobile industry processor interface (MIPI), or an ultra path interconnect (UR) link to exchange a signal (for example, a command or data) with each other. The processor 1110 may communicate with the display module 1140 through a mutually agreed interface, for example, may use any one of the above-described communication methods, and is not limited to the above-described communication method.

The electronic device 1000 according to various embodiments disclosed in the present document may be various types of devices. The electronic device 1000 may include, for example, at least one of a portable communication device (for example, a smartphone), a computer device, a portable multimedia device, a portable medical device, a camera, a wearable device, and a home appliance device. The electronic device 1000 according to an embodiment of the present document is not limited to the above-described devices.

Although the technical spirit of the disclosure has been described in detail in accordance with the above-described embodiments, it should be noted that the above-described embodiments are for the purpose of description and not for limitation. In addition, those skilled in the art may understand that various modifications are possible within the scope of the technical spirit of the disclosure.

The scope of the disclosure is not limited to the details described in the detailed description of the specification. In addition, it is to be construed that all changes or modifications derived from the meaning and scope of the claims and equivalent concepts thereof are included in the scope of the disclosure.

What is claimed is:

1. A display device comprising:
a display panel including pixels;
a display driver configured to provide a data signal to the display panel; a sensor overlapping the display panel;
a sensor driver configured to transmit a driving signal to the sensor and receive sensing signals corresponding to the driving signal from the sensor; and
a memory,
wherein the display driver and the sensor driver share a signal line and are connected to the memory through the signal line, wherein the display driver and the sensor driver are interconnected through a flag signal line, and wherein the sensor driver outputs a flag signal to the flag signal line to inform a display driver that the sensor driver desires to access the memory.

2. The display device according to claim 1, wherein the memory is a nonvolatile memory, and wherein the sensor driver does not include a nonvolatile memory.

3. The display device according to claim 2, wherein the memory stores at least one of firmware and calibration data for the sensor driver, and wherein the sensor driver performs a calculation to calculate a coordinate of an external input to the sensor from the sensing signals using the firmware or calibrates the calculation using the calibration data.

4. The display device according to claim 3, wherein the sensor driver includes a volatile memory, and wherein the sensor driver loads the firmware from the memory into the volatile memory during initial driving.

5. The display device according to claim 3, wherein the memory further stores data regarding a characteristic deviation of the pixels or compensation data for compensating for the characteristic deviation.

6. The display device according to claim 1, wherein one of the display driver and the sensor driver is selectively connected to the memory according to the flag signal, and another of the display driver and the sensor driver becomes a high impedance state with respect to the signal line.

7. The display device according to claim 6, wherein when the sensor driver transmits the flag signal to the display driver through the flag signal line, the sensor driver loads data from the memory, and the display driver has a high impedance state with respect to the memory.

8. The display device according to claim 6, wherein when the display driver transmits the flag signal to the sensor driver through the flag signal line, the display driver loads data from the memory, and the sensor driver has a high impedance state with respect to the memory.

9. The display device according to claim 1, further comprising: a processor, wherein the sensor driver comprises: at least one first terminal connected to the processor; at least one second terminal connected to the signal line; and a third terminal connected to the flag signal line.

10. The display device according to claim 9, wherein the processor further comprises a nonvolatile memory, wherein firmware of the sensor driver is stored in the nonvolatile memory of the processor, and wherein the sensor driver loads the firmware from the nonvolatile memory of the processor.

11. The display device according to claim 10, wherein the memory stores calibration data, and wherein the sensor driver loads the calibration data from the memory.

12. The display device according to claim 1, wherein the pixels include light emitting elements, wherein the display panel further includes an insulating layer covering the light emitting elements, and wherein the sensor is formed directly on the insulating layer.

13. A sensor driver comprising:
a transceiver configured to output a driving signal and receive a sensing signal corresponding to the driving signal;
a controller configured to calculate coordinates of an external input based on the sensing signal;
a first interface circuit configured to output information on the coordinate through a first terminal; and
a second interface circuit configured to receive firmware through a second terminal,
wherein the controller calculates the coordinate from the sensing signal using the firmware, and outputs a flag signal indicating an operation state of the second interface circuit through a third terminal.

14. The sensor driver according to claim 13, wherein a nonvolatile memory is not included.

15. The sensor driver according to claim 14, further comprising:
   a volatile memory storing the firmware, wherein the firmware is received from the volatile memory through the second terminal during an initial driving of the sensor driver.

16. The sensor driver according to claim 14, wherein when the flag signal is applied to the third terminal from an outside source, the second interface circuit unit sets the second terminal to a high impedance state.

* * * * *